US012786869B2

(12) United States Patent
Wu et al.

(10) Patent No.: US 12,786,869 B2
(45) Date of Patent: Nov. 3, 2026

(54) ENERGY SAVING IN CELLULAR WIRELESS NETWORKS VIA TRANSFER DEEP REINFORCEMENT LEARNING

(71) Applicant: SAMSUNG ELECTRONICS CO., LTD., Suwon-si (KR)

(72) Inventors: Di Wu, Saint-Laurent (CA); Yi Tian Xu, Mont-Royal (CA); Michael Jenkin, Montreal (CA); Seowoo Jang, Seongnam-si (KR); Abu Zafar Ekram Hossain, Winnipeg (CA); Xue Liu, Montreal (CA); Gregory Lewis Dudek, Westmount (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 284 days.

(21) Appl. No.: 18/609,797

(22) Filed: Mar. 19, 2024

(65) Prior Publication Data

US 2024/0406861 A1 Dec. 5, 2024

Related U.S. Application Data

(60) Provisional application No. 63/470,131, filed on May 31, 2023.

(51) Int. Cl.
*H04W 52/02* (2009.01)
*H04L 41/16* (2022.01)

(52) U.S. Cl.
CPC ......... *H04W 52/0206* (2013.01); *H04L 41/16* (2013.01)

(58) Field of Classification Search
CPC . H04W 52/0206; H04W 16/22; H04W 24/10; H04L 41/16; G06K 9/6262;
(Continued)

(56) References Cited

U.S. PATENT DOCUMENTS

2015/0189589 A1* 7/2015 Legg .................... H04B 7/0632 370/311
2022/0343117 A1* 10/2022 Jeong .................... H04W 16/22
2024/0056933 A1* 2/2024 Lin .................. H04W 36/0083

FOREIGN PATENT DOCUMENTS

CN 116562464 B 9/2023

OTHER PUBLICATIONS

WO_2021064713_A1 (Year: 2021).*
(Continued)

*Primary Examiner* — Rushil P. Sampat
(74) *Attorney, Agent, or Firm* — Sughrue Mion, PLLC

(57) ABSTRACT

The present disclosure provides methods, apparatuses, systems, and computer-readable mediums for operating a target base station by an apparatus. A method includes collecting a plurality of trajectories corresponding to the target base station and a plurality of source base stations, clustering, using an unsupervised reinforcement learning model, the plurality of trajectories into a plurality of clusters including a target cluster, selecting, as a target trajectory, a selected trajectory from the target cluster that maximizes an energy-saving parameter of the target base station, and applying, to the target base station, an energy-saving control policy corresponding to the target trajectory. The target cluster corresponds to the target base station and at least one source base station from among the plurality of source base stations.

20 Claims, 11 Drawing Sheets

(58) Field of Classification Search
CPC ........ G06N 3/006; G06N 20/00; G06N 3/084; G06N 7/01; G06F 18/217
See application file for complete search history.

(56) References Cited

OTHER PUBLICATIONS

D. Wu et al., "Energy Saving in Cellular Wireless Networks via Transfer Deep Reinforcement Learning," GLOBECOM 2023-2023 IEEE Global Communications Conference, Kuala Lumpur, Malaysia, Dec. 2023, pp. 7019-7024, doi: 10.1109/GLOBECOM54140.2023.10437744.

* cited by examiner

800

ALGORITHM 1 – UTRLES: UNSUPERVISED TRANSFER DEEP REINFORCEMENT LEARNING-BASED ENERGY SAVING

INPUT: PRE-TRAINED SOURCE POLICIES $\pi_{SA}$, ..., $\pi_{SS}$ LEARNED FROM $S$ SOURCE DOMAINS VIA A BASE DEEP RL ALGORITHM. SOURCE TRAFFIC TRAJECTORIES $\tau_1$, ..., $\tau_S$ FROM $S$ SOURCE DOMAINS. THE TOTAL NUMBER OF CLUSTERS $K$. LENGTH FOR THE SHALLOW TESTING $T_N$.

```
1:  COLLECT A SET OF TRAJECTORIES τ_T ON THE TARGET STATION
2:  CLUSTER S SOURCE BASE STATIONS AND THE TARGET BASE STATIONS INTO K CLUSTERS BY APPLYING K-MEANS CLUSTERING ON τ_1, ..., τ_S, AND τ_T
3:  SET THE CLUSTER WITH THE TARGET DOMAIN AS THE TARGET CLUSTER c_0
4:  SET S_N = TOTAL NUMBER OF DOMAINS IN TARGET CLUSTER c_0
5:  FOR s = 1, ..., S_N DO
6:    FOR t = 1, ..., T_N DO
7:       ACCUMULATED REWARD J_S = J_S + r(a_t, s_t) | a ~ π_S
8:    END FOR
9:  END FOR
10: h* = argmax{J_S} π_S
11: π_T = π_S_h*
12: APPLY π_T ON THE TARGET BASE STATION
```

FIG. 8

ENERGY SAVING IN CELLULAR WIRELESS NETWORKS VIA TRANSFER DEEP REINFORCEMENT LEARNING

CROSS-REFERENCE TO RELATED APPLICATIONS

This application claims benefit of priority under 35 U.S.C. § 119 to U.S. Provisional Patent Application No. 63/470,131, filed on May 31, 2023, in the U.S. Patent and Trademark Office, the disclosure of which is incorporated by reference herein in its entirety.

BACKGROUND

1. Field

The present disclosure relates generally to wireless communication systems, and more particularly to methods, apparatuses, systems, and non-transitory computer-readable mediums for energy saving in cellular wireless networks via transfer deep reinforcement learning.

2. Description of Related Art

Demand for wireless data services may have been increasing exponentially in recent years due to increasing use of data-intensive mobile applications and/or increasing number of mobile users and/or devices (e.g., Internet of Things (IoT) devices). In order to potentially address this demand, a large number of new cellular base stations may be deployed around the world, which may lead to significant increases in energy consumption and greenhouse gas emissions. Consequently, energy consumption may have emerged as a key concern in related fifth-generation (5G) wireless communication networks and other related wireless communication systems.

Reinforcement learning (RL) may have emerged as a possible technique for addressing network optimization problems, such as energy consumption, by adjusting and/or adapting network control policies, observing and/or measuring the effects on the performance of the network, and learning network control policies that may potentially improve the performance of the network. However, RL (e.g., deep RL) may require a large number of interactions with the network system and/or environment, which may limit the applicability of RL in real-world scenarios.

Thus, there exists a need for further improvements to wireless communication systems, as the need for data-intensive wireless services and/or increasing numbers of network users may be constrained by energy consumption of the wireless communication networks. Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, systems, and non-transitory computer-readable mediums for operating a target base station are disclosed by the present disclosure. Aspects of the present disclosure provide for applying, to the target base station, an energy-saving control policy that has been selected using an unsupervised transfer reinforcement learning framework that potentially reduces an energy consumption of the target base station, when compared to related base stations.

According to an aspect of the present disclosure, a method for operating a target base station, by an apparatus, includes collecting a plurality of trajectories corresponding to the target base station and a plurality of source base stations, clustering, using an unsupervised reinforcement learning model, the plurality of trajectories into a plurality of clusters including a target cluster, selecting, as a target trajectory, a selected trajectory from the target cluster that maximizes an energy-saving parameter of the target base station, and applying, to the target base station, an energy-saving control policy corresponding to the target trajectory. The target cluster corresponds to the target base station and at least one source base station from among the plurality of source base stations, In some embodiments, the method may further include monitoring one or more energy-saving parameters of the target base station, and adjusting the energy-saving control policy applied to the target base station based on the one or more energy-saving parameters.

In some embodiments, the adjusting of the energy-saving control policy of the method may include determining, based on the monitoring, that at least one of the one or more energy-saving parameters of the target base station is outside of a predetermined range of values, and adjusting the energy-saving control policy to cause the at least one of the one or more energy-saving parameters to be within the predetermined range of values.

In some embodiments, the method may further include generating, using a base reinforcement learning model, a plurality of source control policies corresponding to the plurality of source base stations.

In some embodiments, the collecting of the plurality of trajectories of the method may include collecting a plurality of source base station trajectories corresponding to the plurality of source base stations, based on the plurality of source control policies, and the applying of the energy-saving control policy of the method may include selecting the energy-saving control policy from among a control policy of the target base station and the plurality of source control policies.

In some embodiments, the method may further include formulating the plurality of trajectories based on a Markov Decision Process (MDP). Each trajectory of the plurality of trajectories may include a state space, an action space, a reward function, and a state transition probability function.

In some embodiments, the state space may indicate at least one of a number of connected active devices per cell, a cell load ratio, and a throughput per cell, the action space may include at least one of activation thresholds and deactivation thresholds, the reward function may indicate a reward based on at least one of a power consumption and a minimum throughput, and the state transition probability function may indicate a probability of an action from the action space at a state of the state space.

In some embodiments, the selecting of the target trajectory of the method may include performing iterative testing of respective control policies of each trajectory of the target cluster, determining, for each trajectory of the target cluster, an accumulated reward, and selecting, as the target trajectory, the selected trajectory from the target cluster that maximizes the accumulated reward.

In some embodiments, the performing of the iterative testing of the method may include performing iterative testing of the respective control policies of each trajectory of the target cluster for a predetermined number of iterations.

According to an aspect of the present disclosure, an apparatus for operating a target base station includes a memory storing instructions, and one or more processors communicatively coupled to the memory. The one or more processors are configured to execute the instructions to collect a plurality of trajectories corresponding to the target base station and a plurality of source base stations, cluster, using an unsupervised reinforcement learning model, the plurality of trajectories into a plurality of clusters including a target cluster, select, as a target trajectory, a selected trajectory from the target cluster that maximizes an energy-saving parameter of the target base station, and apply, to the target base station, an energy-saving control policy corresponding to the target trajectory. The target cluster corresponds to the target base station and at least one source base station from among the plurality of source base stations.

In some embodiments, the one or more processors of the apparatus may be further configured to execute further instructions to monitor one or more energy-saving parameters of the target base station, and adjust the energy-saving control policy applied to the target base station based on the one or more energy-saving parameters.

In some embodiments, the one or more processors of the apparatus may be further configured to execute further instructions to determine, based on the monitoring, that at least one of the one or more energy-saving parameters of the target base station is outside of a predetermined range of values, and adjust the energy-saving control policy to cause the at least one of the one or more energy-saving parameters to be within the predetermined range of values.

In some embodiments, the one or more processors of the apparatus may be further configured to execute further instructions to generate, using a base reinforcement learning model, a plurality of source control policies corresponding to the plurality of source base stations.

In some embodiments, the one or more processors of the apparatus may be further configured to execute further instructions to collect a plurality of source base station trajectories corresponding to the plurality of source base stations, based on the plurality of source control policies, and select the energy-saving control policy from among a control policy of the target base station and the plurality of source control policies.

In some embodiments, the one or more processors of the apparatus may be further configured to execute further instructions to formulate the plurality of trajectories based on an MDP. Each trajectory of the plurality of trajectories may include a state space, an action space, a reward function, and a state transition probability function.

In some embodiments, the state space may indicate at least one of a number of connected active devices per cell, a cell load ratio, and a throughput per cell, the action space may include at least one of activation thresholds and deactivation thresholds, the reward function may indicate a reward based on at least one of a power consumption and a minimum throughput, and the state transition probability function may indicate a probability of an action from the action space at a state of the state space.

In some embodiments, the one or more processors of the apparatus may be further configured to execute further instructions to perform iterative testing of respective control policies of each trajectory of the target cluster, determine, for each trajectory of the target cluster, an accumulated reward, and select, as the target trajectory, the selected trajectory from the target cluster that maximizes the accumulated reward.

In some embodiments, the one or more processors of the apparatus may be further configured to execute further instructions to perform iterative testing of the respective control policies of each trajectory of the target cluster for a predetermined number of iterations.

According to an aspect of the present disclosure, an apparatus for operating a target base station includes means for collecting a plurality of trajectories corresponding to the target base station and a plurality of source base stations, means for clustering, using an unsupervised reinforcement learning model, the plurality of trajectories into a plurality of clusters including a target cluster, means for selecting, as a target trajectory, a selected trajectory from the target cluster that maximizes an energy-saving parameter of the target base station, and means for applying, to the target base station, an energy-saving control policy corresponding to the target trajectory. The target cluster corresponds to the target base station and at least one source base station from among the plurality of source base stations.

According to an aspect of the present disclosure, a non-transitory computer-readable storage medium storing computer-executable instructions for operating a target base station by an apparatus is provided. The computer-executable instructions, when executed by at least one processor of the apparatus, cause the apparatus to collect a plurality of trajectories corresponding to the target base station and a plurality of source base stations, cluster, using an unsupervised reinforcement learning model, the plurality of trajectories into a plurality of clusters including a target cluster, select, as a target trajectory, a selected trajectory from the target cluster that maximizes an energy-saving parameter of the target base station, and apply, to the target base station, an energy-saving control policy corresponding to the target trajectory. The target cluster corresponds to the target base station and at least one source base station from among the plurality of source base stations.

In some embodiments, the computer-executable instructions, when executed by the at least one processor, may further cause the apparatus to monitor one or more energy-saving parameters of the target base station, and adjust the energy-saving control policy applied to the target base station based on the one or more energy-saving parameters.

Additional aspects are set forth in part in the description that follows and, in part, may be apparent from the description, or may be learned by practice of the presented embodiments of the disclosure.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 8 depicts an example of an algorithm for operating a target base station, in accordance with various aspects of the present disclosure;

DETAILED DESCRIPTION

Figure 1:
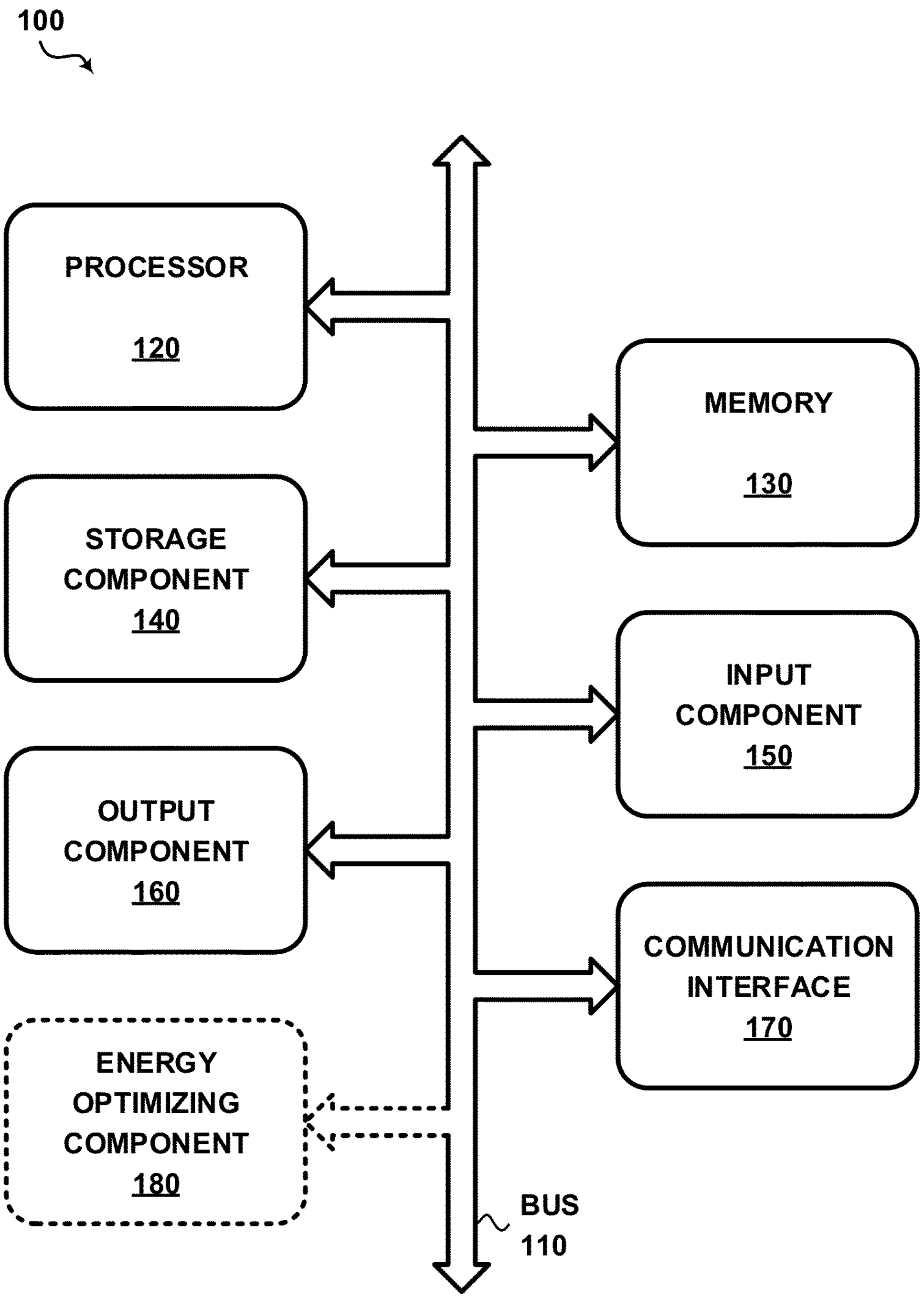
FIG. 1 illustrates an example of a device that may be used in implementing one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it is to be apparent to those skilled in the art that these concepts may be practiced without these specific details. In some instances, well known structures and components are shown in block diagram form in order to avoid obscuring such concepts. In the descriptions that follow, like parts are marked throughout the specification and drawings with the same numerals, respectively.

The following description provides examples, and is not limiting of the scope, applicability, or embodiments set forth in the claims. Changes may be made in the function and/or arrangement of elements discussed without departing from the scope of the present disclosure. Various examples may omit, substitute, or add various procedures or components as appropriate. For example, the methods described may be performed in an order different from that described, and various steps may be added, omitted, and/or combined. Alternatively or additionally, features described with reference to some examples may be combined in other examples.

Various aspects and/or features may be presented in terms of systems that may include a number of devices, components, modules, and the like. It is to be understood and appreciated that the various systems may include additional devices, components, modules, and the like and/or may not include all of the devices, components, modules, and the like discussed in connection with the figures. A combination of these approaches may also be used.

As a general introduction to the subject matter described in more detail below, aspects described herein are directed towards apparatuses, methods, systems, and non-transitory computer-readable mediums for operating a target base station are disclosed by the present disclosure. Aspects described herein may be used to apply, to the target base station, an energy-saving control policy that has been selected using an unsupervised transfer reinforcement learning (RL) framework that potentially reduces an energy consumption of the target base station, when compared to related base stations.

Aspects presented herein may provide for an unsupervised transfer deep RL framework for energy optimization. An example of deep learning may refer to a form of machine learning that may use a neural network to transform a set of inputs into a set of outputs via an artificial neural network, unsupervised learning may refer to a technique in machine learning where algorithms (e.g., neural networks) learn patterns from unlabeled data sets and use an error in the mimicked output (e.g., a reward value) to correct themselves, and reinforcement learning (RL) may refer to a process in which an agent (e.g., algorithm, neural network) may learn to make decisions through trial and error. For example, in RL, a problem may be modeled as a Markov decision process (MDP), where an agent may, at every time step, be in a state, take an action, receive a reward, and transition to a next state according to environmental dynamics. In such an example, the RL agent may attempt to learn a policy (e.g., a mapping from observations to actions) that may maximize returns (e.g., expected sum of rewards). An example of deep RL may refer to a form of RL in which the state of the MDP may be high-dimensional (e.g., configuration state of a network node) that may not be capable of being solved via a related RL algorithm. In some examples, deep RL may incorporate deep learning to solve such high-dimensional MDPs and/or other learning functions, such as, but not limited to, neural networks, specialized algorithms, and the like.

However, RL (e.g., deep RL) may require a large number of interactions with the network system and/or environment, which may limit the applicability of RL in real-world scenarios. To that end, transfer learning may be applied to a deep RL framework to potentially improve the performance of the deep RL framework. An example of transfer learning may refer to a form of machine learning that may involve leveraging knowledge learned in one task to improve performance on another related task, which may potentially reduce the number of samples that may be needed to learn a new model on the new task. For example, a target model may be pre-trained with another source model (e.g., initialized with the weights of the source model). In such an example, the target model may learn a policy that may maximize returns more efficiently and/or with fewer iterations and/or training data samples, when compared to a model that may have been randomly initialized. That is, transfer learning may be used to potentially overcome at least some of the challenges presented by the application of deep RL in real-world scenarios.

Consequently, the unsupervised transfer deep RL framework provided by the present disclosure may be pre-trained using a set of RL-based energy saving policies on source base stations of a cellular communication network. The unsupervised transfer deep RL framework may transfer a selected policy that potentially maximizes energy performance to a target base station of the cellular communication network in an unsupervised learning manner. Thus, the target base station may have a potentially improved energy performance based on dynamic traffic scenarios in a real-world scenario, thereby potentially having a significantly reduced energy consumption when compared to related base stations.

The aspects described herein may provide advantages over related energy optimization approaches by providing an unsupervised transfer deep RL framework that may dynamically adjust and/or adapt network control policies based on changes to system dynamics of the network and/or changes to the network environment. Advantageously, aspects described herein may further provide for an unsupervised transfer deep RL framework that may efficiently determine an energy-saving control policy without the need for a potentially excessive number of training iterations and/or data samples, when compared to related RL frameworks.

Although the present disclosure describes an unsupervised transfer deep RL framework for energy optimization in a wireless communication network, the present disclosure is not limited in this regard. For example, the concepts described herein may be applied to other applications, such as, but not limited to, robotics control, game playing, health informatics, electricity networks, intelligent transportation systems, automatic driving, and the like. Notably, the aspects presented herein may be applied to optimize a policy that may control a high-dimensional model and/or state.

As noted above, certain embodiments are discussed herein that relate to operating a target base station. Before discussing these concepts in further detail, however, an example of a computing device that may be used in implementing and/or otherwise providing various aspects of the present disclosure is discussed with respect to FIG. 1.

FIG. 1 depicts an example of a device 100 that may be used in implementing one or more aspects of the present disclosure in accordance with one or more illustrative aspects discussed herein. For example, device 100 may, in some instances, implement one or more aspects of the present disclosure by reading and/or executing instructions and performing one or more actions accordingly. In one or more arrangements, device 100 may represent, be incorporated into, and/or include a base station (e.g., a Node B, a next generation Node B (gNB), an evolved Node B (eNB), an access point, a base transceiver station, a radio base station, a radio transceiver, a transceiver function, a basic service set (BSS), an extended service set (ESS), a transmit reception point (TRP), or some other suitable terminology), a server (e.g., data server, parameter server, web server, and the like). Alternatively or additionally, the device 100 may represent, be incorporated into, and/or include a desktop computer, a computer server, a virtual machine, a network appliance, a mobile device (e.g., a user equipment (UE), a laptop computer, a tablet computer, a personal digital assistant (PDA), a smart phone, any other type of mobile computing device, and the like), a wearable device (e.g., smart watch, headset, headphones, and the like), a smart device (e.g., a voice-controlled virtual assistant, a set-top box (STB), a refrigerator, an air conditioner, a microwave, a television, and the like), an Internet-of-Things (IoT) device, and/or any other type of data processing device.

For example, the device 100 may include a processor, a personal computer (PC), a printed circuit board (PCB) including a computing device, a mini-computer, a mainframe computer, a microcomputer, a telephonic computing device (e.g., a cellular phone, a smart phone, a session initiation protocol (SIP) phone, a wired/wireless computing device (e.g., a smartphone, a PDA), a laptop, a tablet, a smart device, a wearable device, or any other similar functioning device.

In some embodiments, as shown in FIG. 1, the device 100 may include a set of components, such as a processor 120, a memory 130, a storage component 140, an input component 150, an output component 160, a communication interface 170, and an energy optimizing component 180. The set of components of the device 100 may be communicatively coupled via a bus 110.

The bus 110 may include one or more components that may permit communication among the set of components of the device 100. For example, the bus 110 may be a communication bus, a cross-over bar, a network, or the like. Although the bus 110 is depicted as a single line in FIG. 1, the bus 110 may be implemented using multiple (e.g., two or more) connections between the set of components of device 100. The present disclosure is not limited in this regard.

The device 100 may include one or more processors, such as the processor 120. The processor 120 may be implemented in hardware, firmware, and/or a combination of hardware and software. For example, the processor 120 may include a central processing unit (CPU), an application processor (AP), a graphics processing unit (GPU), an accelerated processing unit (APU), a microprocessor, a microcontroller, a digital signal processor (DSP), a field-programmable gate array (FPGA), an application-specific integrated circuit (ASIC), an image signal processor (ISP), a neural processing unit (NPU), a sensor hub processor, a communication processor (CP), an artificial intelligence (AI)-dedicated processor designed to have a hardware structure specified to process an AI model, a general purpose single-chip and/or multi-chip processor, or other programmable logic device, discrete gate or transistor logic, discrete hardware components, or any combination thereof designed to perform the functions described herein. A general purpose processor may include a microprocessor, or any conventional processor, controller, microcontroller, or state machine.

The processor 120 may also be implemented as a combination of computing devices, such as a combination of a DSP and a microprocessor, a combination of a main processor and an auxiliary processor, a plurality of microprocessors, one or more microprocessors in conjunction with a DSP core, or any other such configuration. In some embodiments, particular processes and methods may be performed by circuitry that is specific to a given function. In optional or additional embodiments, an auxiliary processor may be configured to consume less power than the main processor. Alternatively or additionally, the one or more processors may be implemented separately (e.g., as several distinct chips) and/or may be combined into a single form.

The processor 120 may control overall operation of the device 100 and/or of the set of components of device 100 (e.g., the memory 130, the storage component 140, the input component 150, the output component 160, the communication interface 170, and the energy optimizing component 180).

The device 100 may further include the memory 130. In some embodiments, the memory 130 may include volatile memory such as, but not limited to, random access memory (RAM), static RAM (SRAM), dynamic RAM (DRAM), and the like. In optional or additional embodiments, the memory 130 may include non-volatile memory such as, but not limited to, read only memory (ROM), electrically erasable programmable ROM (EEPROM), NAND flash memory, phase-change RAM (PRAM), magnetic RAM (MRAM), resistive RAM (RRAM), ferroelectric RAM (FRAM), magnetic memory, optical memory, and the like. However, the present disclosure is not limited in this regard, and the memory 130 may include other types of dynamic and/or static memory storage. In an embodiment, the memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further include the input component 150. The input component 150 may include one or more components that may permit the device 100 to receive information, such as via user input (e.g., a touch screen, a keyboard, a keypad, a mouse, a stylus, a button, a switch, a microphone, a camera, a virtual reality (VR) headset, haptic gloves, and the like). Alternatively or additionally, the input component 150 may include one or more sensors for sensing information (e.g., a global positioning system (GPS) component, an accelerometer, a gyroscope, an actuator, a transducer, a contact sensor, a proximity sensor, a ranging device, a camera, a video camera, a depth camera, a time-of-flight (TOF) camera, a stereoscopic camera, and the like). In an embodiment, the input component 150 may include more than one of a same sensor type (e.g., multiple cameras).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, a buzzer, an alarm, and the like).

The device 100 may further include the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as, FlashLinQ, WiMedia, Bluetooth™, Bluetooth™ Low Energy (BLE), ZigBee, Institute of Electrical and Electronics Engineers (IEEE) 802.11x (Wi-Fi), LTE, 5G, and the like. In optional or additional embodiments, the communication interface 170 may include an Ethernet interface, an optical interface, a coaxial interface, an infrared interface, a radio frequency (RF) interface, a USB interface, an IEEE 1094 (FireWire) interface, or the like.

In some embodiments, the device 100 may include the energy optimizing component 180, which may be configured to operate a target base station (e.g., device 100). For example, the energy optimizing component 180 may be configured to collect a plurality of trajectories, cluster the plurality of trajectories into a plurality of clusters, select a target trajectory from the target cluster that maximizes an energy-saving parameter of the target base station, and apply an energy-saving control policy to the target base station.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A non-transitory memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may perform one or more functions described as being performed by another set of components shown in FIG. 1.

Having discussed an example of a device that may be used in providing and/or implementing various aspects of the present disclosure, a number of embodiments are now discussed in further detail. In particular, and as introduced above, some aspects of the present disclosure generally relate to operating a target base station.

Recently, demand for wireless data services may have increased at least in part due to the development and adoption of IoT devices and significant growth in the number of global mobile users. In addition, the amount of wireless data transmissions worldwide may have significantly increased. In order to potentially address these increasing demands for number of users, data throughput, data bandwidth, and the like, network operators may deploy increasing numbers of new cellular base stations around the world. In addition, some base stations may need to be located in remote locations for which existing power distribution infrastructure may be insufficient. Consequently, the increase in the number of base stations and/or the increased cost of providing power distribution to the base stations may lead to a surge in network-related energy consumption resulting in a significant increase in network operational expenditures (OPEX). In particular, energy consumption of base stations for newer wireless technologies (e.g., 5G and above) may be larger (e.g., greater) than energy consumption per base station for previous-generation systems (e.g., 3G). In addition to potentially higher OPEX, the increased energy consumption of the newer wireless technologies may result in increased greenhouse gas emissions, when compared to the previous-generation systems, which may be a growing concern for network operators and/or the general public.

In related wireless communication systems, a majority of the total energy consumed by the system may be consumed by the base stations. Thus, improving the energy efficiency of the base stations may potentially result in a significant reduction in the overall energy consumption of the wireless communication system, reduced operational costs, and/or a smaller carbon footprint. Related wireless communication systems may be designed to support a maximum traffic load. However, in practice, wireless communication systems may rarely need to support the designed maximum traffic load. That is, the related wireless communication systems may typically be underutilized, and as such, may result in unnecessary energy consumption, operational costs, and/or carbon emissions. For example, the network infrastructure of such wireless communication systems may be underutilized during certain periods of the day, such as, but not limited to, late night and/or early morning when most users may be asleep and/or businesses may be closed, for example. However, the present disclosure is not limited in this regard, and the communication systems may be underutilized during other and/or different periods (e.g., government and/or work holidays).

For related base stations, power amplifiers associated with a cell (e.g., a combination of a sector and/or a frequency) may be a significant contributor to the power consumption of the base station. Related wireless communication systems may allow network operators to turn off (and/or later turn on) specified network cells to reduce the energy consumption of the power amplifiers of the base station. Alternatively or additionally, the wireless communication systems may provide redundant wireless network coverage (e.g., coverage areas may be supported by two or more base stations and/or cells). Thus, the wireless communication systems may be able to maintain network coverage and potentially achieve energy savings (e.g., reduce energy consumption) by turning off base stations and/or turning off portions of the base station during periods of low utilization, as described with reference to FIG. 2.

Figure 2:
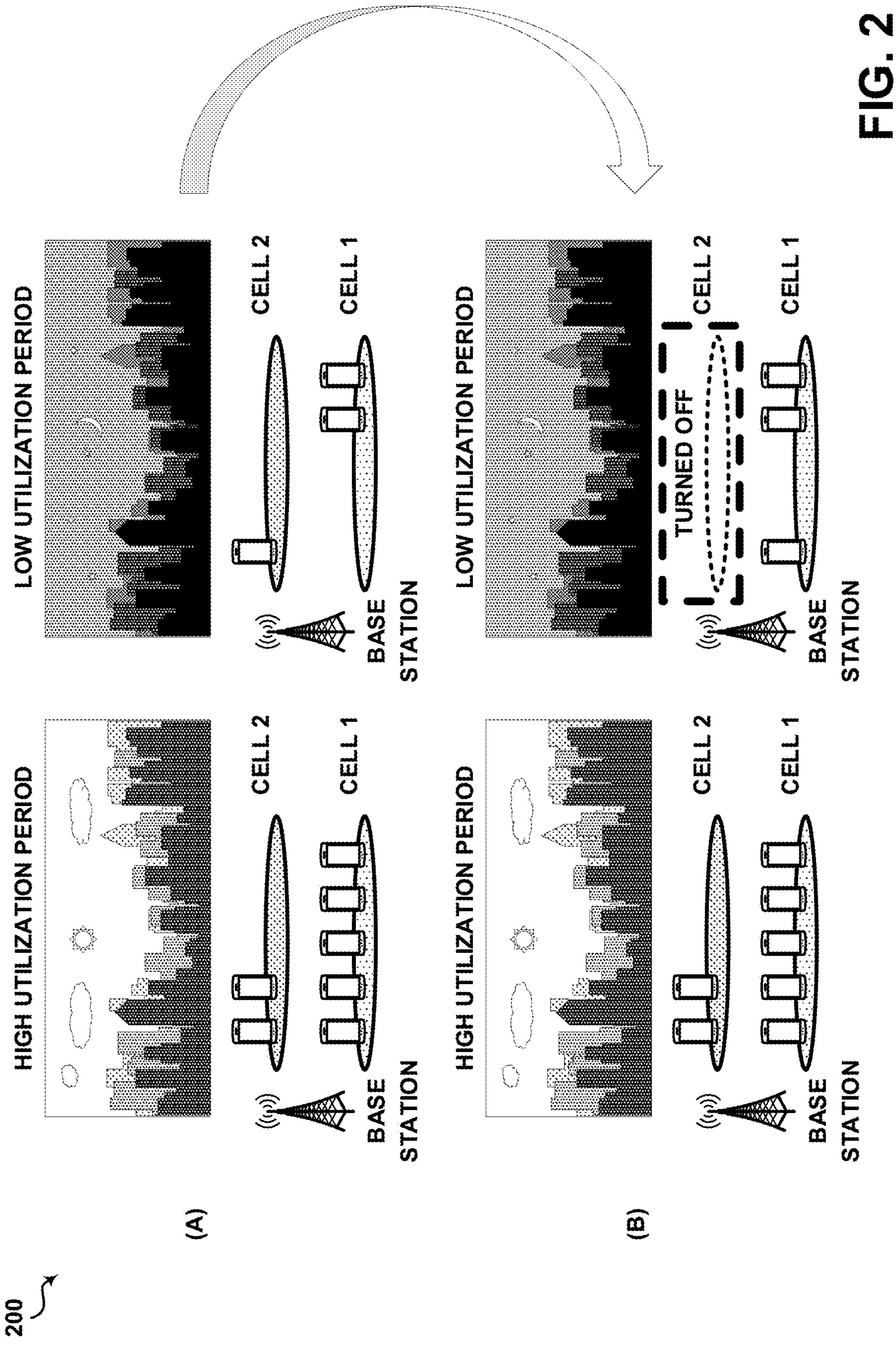
FIG. 2 depicts an example application of an energy-saving control policy, in accordance with various aspects of the present disclosure.

FIG. 2 depicts an example application of an energy-saving control policy, in accordance with various aspects of the present disclosure. Referring to FIG. 2, a base station may operate one or more cells (e.g., cell 1 and cell 2) that may support and/or provide communication with one or more UEs. As shown in (A) of FIG. 2, five (5) UEs may be connected to the base station via cell 1, and two (2) UEs may be connected to the base station via cell 2 during a high utilization period (e.g., daytime hours), and two (2) UEs may be connected to the base station via cell 1 and one (1) UE may be connected to the base station via cell 2 during a low utilization period (e.g., nighttime hours). That is, during the low utilization period, at least one of the cells of the base station may be underutilized, and thus, the energy consumption of the base station may be higher than needed given the number of devices (e.g., UEs) and/or users being provided services by the base station.

As shown in (B) of FIG. 2, the base station may turn off (e.g., change to sleep mode) cell 2 and handover the UE connected to cell 2 to cell 1. Thereby, the base station may reduce a total energy consumption while maintaining an acceptable service level for devices and/or users connected to the base station.

Although FIG. 2 depicts a base station deploying two (2) cells (e.g., cell 1 and cell 2) in which up to five (5) UEs and up to two (2) UEs are respectively connected, the present disclosure is not limited in this regard. That is, the wireless communication network may include additional base stations, and/or the base station may deploy a different number of cells (e.g., one (1) cell, three (3) or more cells) to which other quantities of UEs and/or wireless communication devices may be connected (e.g., six (6) or more). In addition, although FIG. 2 depicts the energy-saving policy causing the base station to handover a UE from cell 2 to cell 1 and turning off cell 2, the energy-saving policy may cause the base station to perform alternative or additional actions to potentially achieve a reduction in the total energy consumption of the base station. That is, the present disclosure is not limited in this regard. For example, the base station may handover the UEs in cell 1 to cell 2 and turn off cell 1. As another example, the base station may handover the UEs in cells 1 and 2 to a third cell and turn off both cell 1 and cell 2. As yet another example, the base station may handover the UEs in cells 1 and 2 to one or more cells of other base stations in the wireless communication network, and turn off (e.g., enter a power saving mode) the entire base station.

Energy saving for base stations may be desirable as a possible technique for addressing concerns regarding potentially higher OPEX and/or increased greenhouse gas emissions for newer wireless technologies (e.g., eNB, gNB, and the like) when compared to base stations of previous-generation systems (e.g., Node B, and the like). To that end, several approaches may have been developed to potentially reduce the energy consumption of base stations. For example, one approach may involve turning off (or entering a power-saving mode) a base station (or entering a power-saving mode) when a number of users connected to the base station falls below a predetermined threshold. In such an example, the predetermined threshold may be learned (e.g., automatically determined and/or updated) and/or may be manually hand-tuned (e.g., manually determined by a network operator). Alternatively or additionally, at least one of a stochastic geometry-based sleep strategy and a prediction-based cell on/off control scheme may be used to determine whether to turn off a base station and/or portions of a base station. As another example, the energy consumption of a base station may potentially be affected by reducing a coverage area provided by a cell of the base station. An example of such a reduction in coverage area may be referred to as cell zooming. In such an example, the cell zooming may be performed by reducing a cell voltage (e.g., a voltage provided to a power amplifier of the cell). Alternatively or additionally, cell coverage of the base station may be optimized for a certain number of users by performing an adaptive cell zooming scheme on the base station (and/or neighboring base stations). That is, the cell zooming may involve solving a cooperative game model of the wireless communication network.

That is, potential approaches for providing energy savings to base stations of a wireless communication network may need a mechanism for determining when the approaches need to be applied. However, determining when these approaches may need to be applied may be a complex decision process given the dynamic nature of network communication loads, number of users, coverage areas, and the like in wireless communication networks. For example, network traffic load may be dynamic and may vary significantly during different periods of the day (e.g., daytime, nighttime).

Aspects described herein provide apparatuses, methods, systems, and non-transitory computer-readable mediums for adjusting network operations of base stations to potentially improve (e.g., reduce) power consumption, when compared to related base stations. In particular, aspects described herein formulate a base station cell on-off control problem as a MDP and use deep RL to address the formulated MDP problem. In addition, aspects described herein use unsupervised transfer learning with the deep RL to select an optimized pre-trained RL-based energy-saving policy that may be applied to a target base station. That is, aspects described herein provide parameter optimization approaches to dynamically change system parameters, and thereby, potentially improve system performance (e.g., increased data throughput, reduced energy consumption) of base stations of a wireless communication network.

Although the present disclosure describes aspects that provide for energy optimization in a wireless communication network, the present disclosure is not limited in this regard. For example, the concepts described herein may be applied to other applications, such as, but not limited to, robotics control, game playing, health informatics, electricity networks, intelligent transportation systems, automatic driving, and the like. For example, the aspects presented herein may be applied to traffic controllers of an intelligent transportation system. As another example, the aspects presented herein may be applied to electricity networks and/or smart homes to optimize power distribution and/or determine operation times for relatively heavy power consumers (e.g., home appliances, electric vehicle (EV) charging stations, and the like). Notably, the aspects presented herein may be applied to optimize a policy that may control a high-dimensional model and/or state.

Hereinafter, various embodiments of the present disclosure are described with reference to FIGS. 3 to 11.

Figure 3:
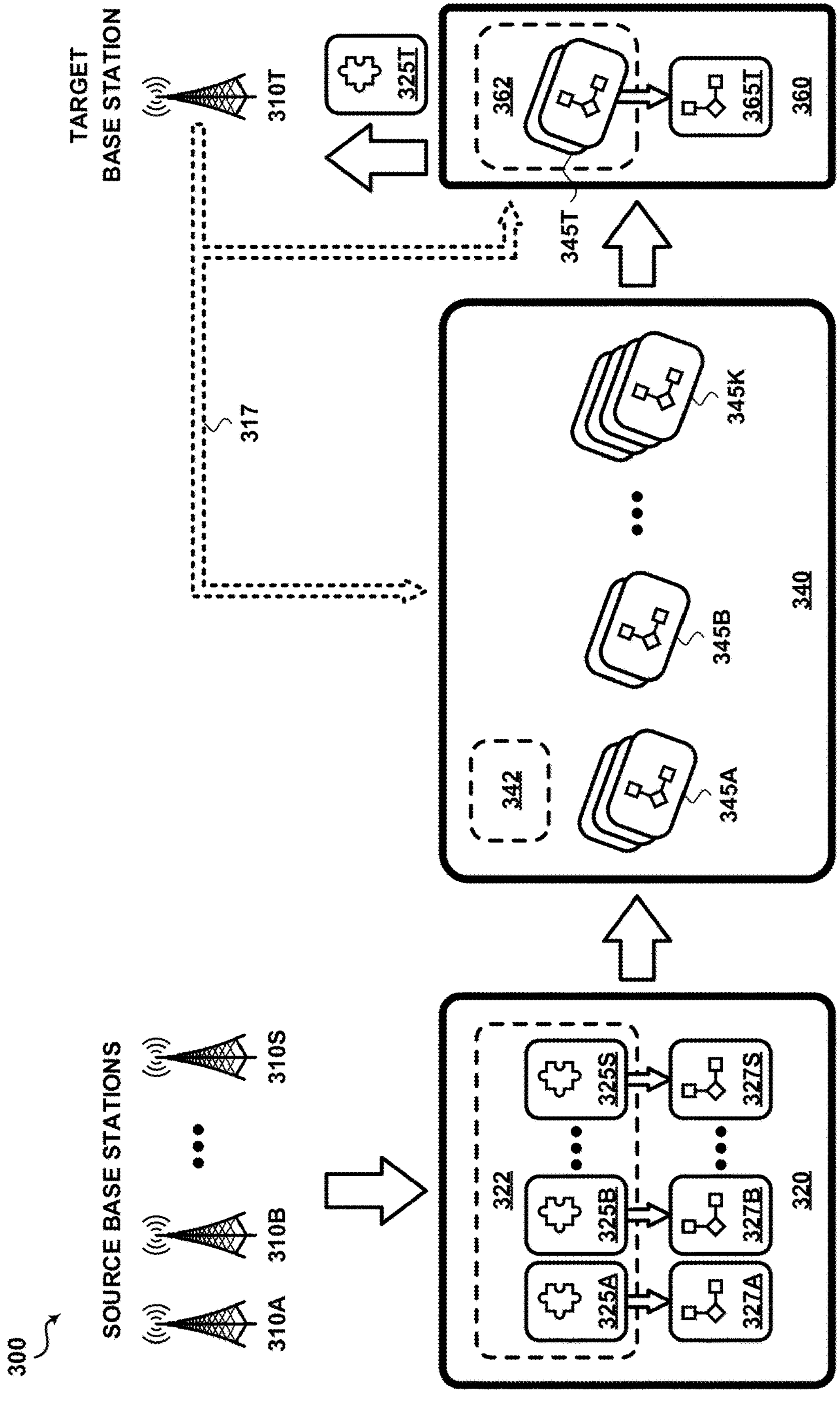
FIG. 3 illustrates an example of a block diagram for operating a target base station, in accordance with various aspects of the present disclosure.

FIG. 3 illustrates an example of a block diagram for operating a target base station, in accordance with various aspects of the present disclosure.

Referring to FIG. 3, a block diagram 300 of the unsupervised transfer deep RL framework that implements one or more aspects of the present disclosure is illustrated. In some embodiments, at least a portion of the block diagram 300 as described with reference to FIG. 3 may be performed by the device 100 of FIG. 1, which may include the energy optimizing component 180. Alternatively or additionally, another computing device (e.g., a base station, a UE, a server, a laptop, a smartphone, a wearable device, a smart device, an IoT device, and the like) that may include the energy optimizing component 180 may perform at least a portion of the block diagram 300. That is, the device 100 may perform a portion of the block diagram 300 as described with reference to FIG. 3 and a remaining portion of the block diagram 300 may be performed by one or more other computing devices.

In some embodiments, the block diagram 300 depicted in FIG. 3 may be used to implement at least a portion of the example application of FIG. 2, and may include additional features not mentioned above.

As shown in FIG. 3, the unsupervised transfer deep RL framework may include a preparing component 320, a clustering component 340, and a selecting component 360.

The preparing component 320 may use a base RL algorithm 322 to learn a plurality of source control policies (e.g., first source control policy 325A, second source control policy 325B, to S-th source control policy 325S, where S is a positive integer greater than zero (0), hereinafter generally referred to as "325") from a plurality of source base stations (e.g., first source base station 310A, second source base station 310B, to S-th source base station 310S, hereinafter generally referred to as "310").

An example of an RL agent may refer to a learning paradigm that may learn a control policy through iterations with an environment (e.g., a wireless communication network). At each step t (e.g., $t\in\{0, 1, \ldots\}$), an RL agent may apply an action based on the current state of the environment. In some embodiments, the RL agent may have a finite time horizon, $t\in\mathcal{T}$, such that $\mathcal{T}$ may represent the lifespan of the RL agent. The applied action may change the state of the environment, and the RL agent may receive a reward signal that the RL agent may use to determine the effectiveness of the applied action. In some embodiments, the RL agent may be formulated as an MDP that may be represented by a tuple of five (5) elements, which may include a state space $\mathcal{S}$ of the environment, an action space $\mathcal{A}$ of the RL agent, a transition probability $\mathcal{P}(s_{t+1}|s_t, a_t)$ of transitioning from one state to another state when an action is applied, where $s_{t+1}, s_t\in\mathcal{S}$ and $a_t\in\mathcal{A}$, a reward function $\mathcal{r}(s_t, a_t)$, and an initial state distribution $\mu(s_0)$. A control policy $\pi$ may determine the action $a_t$ that the RL agent may take at a specific state $s_t$. For example, the RL agent may learn a control policy $\pi^*$ that may maximize a reward return $\mathcal{R}$ over the lifespan $\mathcal{T}$ of the RL agent, as represented by an equation similar to Equation 1.

$$\pi^* = \arg\max_{\pi} \mathcal{R}(\tau_\pi) = \arg\max_{\pi} \sum_{t=0}^{\mathcal{T}-1} \gamma^t \mathcal{r}(s_t, a_t) \quad \text{[Eq. 1]}$$

Referring to Equation 1, $\tau_\pi=(s_0, a_0, s_1, a_1, \ldots, s_{\mathcal{T}}, a_{\mathcal{T}})$ may represent a trajectory that may capture the states visited by the RL agent, the actions taken by the RL agent, and the rewards received by the RL agent when following control policy $\pi$, and $\gamma$ may represent a reward discount factor (e.g., $0<\gamma\leq 1$).

In some embodiments, the RL agent may be configured to model a cell on-off mechanism to potentially reduce the energy consumption of a base station. For example, the RL agent may model a cell as a combination of a sector and a frequency of a base station. For each cell of the base station, the cell may be assigned at least one of two thresholds, an activation threshold $th_{act}$ and a deactivation threshold $th_{deact}$. For example, when the utilization of a cell c falls below the deactivation threshold $th_{deact}$, the cell c may be turned off and/or made to enter a sleep mode such that the cell c may operate at a lower energy consumption level $$\mathcal{P}_c^{sleep},$$

when compared to an energy consumption level when the cell c is turned on and/or in an active mode. In such an example, UEs that may be connected to the cell c may be moved (e.g., handover) to neighboring and/or nearby cells based on performance parameters, such as, but not limited to reference signal received power (RSRP). Alternatively or additionally, when the utilization of the cell c exceeds the activation threshold $th_{act}$, a turned off and/or sleeping neighboring cell j may be turned on and/or made to enter the active mode, and UEs may be connected to the now active neighboring cell j. An energy consumption of the neighboring cell j may be proportional to its utilization $$(\mathcal{P}_j^0 + \ell_j \mathcal{P}_j^L),$$

where $$\mathcal{P}_j^0$$

may represent an idle power consumption of the neighboring cell j when the utilization of the neighboring cell j is zero (0) and where the idle power consumption $$\mathcal{P}_j^0$$

may be greater than the sleep mode power consumption $$\mathcal{P}_j^{sleep}$$

of the neighboring cell j (e.g., $$\mathcal{P}_j^0 > \mathcal{P}_j^{sleep}),$$

where $\ell_j$ may represent a load-related proportional coefficient, and where $$\mathcal{P}_j^L$$

may represent a power consumption variable that may scale with the load of the neighboring cell j.

Tuning the activation threshold $th_{act}$ and the deactivation threshold $th_{deact}$ for the cells of the base station may provide for optimizing energy savings of the base station without significantly impacting a quality of service (QoS) and/or performance level (e.g., data throughput, coverage area) of the base station. For example, when the deactivation threshold $th_{deact}$ is too low, the cells of the base station may be placed into sleep mode conservatively, thus saving less energy. As another example, when both the activation threshold $th_{act}$ and the deactivation threshold $th_{deact}$ are too high, each of the cells may need to support a large amount of UEs, which may cause congestion on the active cells of the base station. Alternatively or additionally, when the activation threshold $th_{act}$ is too low and the deactivation threshold $th_{deact}$ is too high, the cells may fluctuate between sleep and active modes, which may result in a ping-pong effect.

In some embodiments, the cell on-off mechanism modeled by the RL agent may be formulated as an MDP. For example, in such embodiments, a state of the MDP may represent a current state of the communication network, and the activation threshold $th_{act}$ and the deactivation threshold $th_{deact}$ may be used as MDP control actions. That is, a cell on-off mechanism for optimizing energy saving by a base station of a wireless communication network may be formulated as MDP$\langle \mathcal{S}, \mathcal{A}, r, p \rangle$. In such a formulation, state $\mathcal{S}$ may represent a continuous $N_c \times \mathbb{R}^{\geq 3}$ state space, where $N_c$ may represent the number of cells in the base station, and where, for each cell, parameters such as, but not limited to, a number of connected active UEs per cell, a cell load ratio (e.g., physical resource block usage), data throughput per cell, and the like may be used as state variables. Action $\mathcal{A}$ may represent a continuous $(N_c-1)\times \mathbb{R}^2$ action space. As described above, the activation threshold $th_{act}$ and the deactivation threshold $th_{deact}$ may be used as actions. However, the present disclosure is not limited in this regard, and other or different values and/or parameters may be used as actions. In some embodiments, the activation threshold $th_{act}$ and the deactivation threshold $th_{deact}$ for the lowest frequency of each cell may be retained (e.g., remain unchanged) in order to maintain coverage of the cell. The reward function $r$ may be represented as $r: \mathcal{S}\times\mathcal{A}\times\mathcal{S}\rightarrow \mathbb{R}$. In some embodiments, the reward function $r$ may consider a weighted sum of at least two reward components, such as, but not limited to, a power consumption and a minimum data throughput over all the cells. The state transition probability function $p$(s'|s, a) may indicate a probability of transitioning to a new state s' from a previous state s after taking an action a.

Continuing to refer to FIG. 3, the preparing component 320 may use the base RL algorithm to learn a cell on-off strategy for base stations of a wireless communication network. In some embodiments, the base RL algorithm may be and/or may include a machine learning model such as, but not limited to, a proximal policy optimization (PPO) algorithm, and the like. However, the present disclosure is not limited in this regard, and other networks and/or models may be used without departing from the scope of the present disclosure. Notably, the aspects presented herein may be employed with any network and/or model capable of learning an energy saving control policy in a wireless communication network environment.

An example of a PPO algorithm may refer to a policy-based RL algorithm. That is, the RL agent may learn the control policy or trajectory directly. The PPO algorithm may be referred to as a policy gradient algorithm and/or as an on-policy RL algorithm. In some embodiments, the control policy to be optimized and the control policy used to interact with the environment may be substantially similar and/or may be the same policy. A related PPO algorithm may exhibit relatively low data efficiency. However, the PPO algorithm described herein may use a clipped surrogate objective function that may prevent large policy updates that may deteriorate RL performance, and thus, may provide for improved data efficiency when compared with related policy gradient algorithms.

In some embodiments, the preparing component 320 may be configured to use a base RL algorithm 322 (e.g., a PPO algorithm) to learn the plurality of source control policies 325 (e.g., $\pi_{SA}$, $\pi_{SB}$, . . . , $\pi_{SS}$) from the plurality of source base stations 310. That is, the preparing component 320 may be configured to generate, using the base RL algorithm 322, the plurality of source control policies 325 corresponding to the plurality of source base stations 310. The preparing component 320 may be further configured to collect a plurality of trajectories (e.g., first source trajectory $\tau_A$ 327A, second source trajectory $\tau_B$ 327B, to S-th source trajectory $\tau_S$ 327S, and target trajectory $\tau_T$ 327T, hereinafter generally referred to as "327") corresponding to the plurality of source base stations 310 and the target base station 310T. The preparing component 320 may be further configured to formulate the plurality of trajectories 327 based on an MDP. Each trajectory of the plurality of trajectories 327 may include a state space $\mathcal{S}$, an action space $\mathcal{A}$, a reward function $r$, and a state transition probability function $p$. In some embodiments, the state space $\mathcal{S}$ may indicate at least one of a number of connected active devices per cell, a cell load ratio, and a throughput per cell. The action space $\mathcal{A}$ may include at least one of activation thresholds and deactivation thresholds. The reward function $r$ may indicate a reward based on at least one of a power consumption and a minimum throughput. The state transition probability function $p$ may indicate a probability of an action a from the action space $\mathcal{A}$ at a state s of the state space $\mathcal{S}$.

The clustering component 340, as shown in FIG. 3, may apply a clustering algorithm 342 to the plurality of trajectories 327 to cluster (e.g., group and/or partition) the plurality of trajectories 327 into a plurality of K clusters (e.g., first cluster 345A, second cluster 345B, to K-th cluster 345K, hereinafter generally referred to as "345"), where K is a positive integer greater than zero (0) and K is less than S (e.g., K<S). In some embodiments, the clustering algorithm 342 may be and/or may include a K-means clustering algorithm that may be configured to partition the plurality of trajectories 327 into the plurality of K clusters 345 so as to minimize a variance within each cluster. For example, the clustering algorithm 342 may be configured to minimize a within-cluster sum of squares (WCSS) variance that may be based on the sum of squared distances between each trajectory 327 and a centroid of the cluster 345.

In some embodiments, the selecting component 360 may be configured to select, from the plurality of K clusters 345, a target cluster $c_0$ 345T that corresponds to the target base station 310T and at least one source base station from among the plurality of source base stations 310. That is, the selecting component 360 may be configured to select, from among the plurality of K clusters 345, the target cluster $c_0$ 345T that includes the target base station 310T, and such, may also include one or more source base stations from among the plurality of source base stations 310 that may be most similar (e.g., minimize a variance) to the target base station 310T. In an example, the source control policies 325 (e.g., $\pi_{SA}$, $\pi_{SB}$, . . . , $\pi_{SS}$) corresponding to the source base stations 310 included in the target cluster $c_0$ 345T may be referred to as candidate source control policies.

Continuing to refer to FIG. 3, the selecting component 360 may include an unsupervised transfer learning model 362 that may learn a target control policy based on the candidate source control policies. That is, the unsupervised transfer learning model 362 may use (or transfer) knowledge learned from the candidate source control policies to potentially improve and/or accelerate the learning process of the target control policy. For example, a target domain may refer to a domain of the target base station for which only a relatively limited amount of training data may be available. As another example, a source domain may refer to a domain that may be related to the target domain for which a relatively large amount of training data may be available. As such, the unsupervised transfer learning model 362 may transfer knowledge from the one or more source domains of the candidate source control policies to the target domain to learn the target control policy.

The selecting component 360 may be further configured to perform shallow testing on the target domain with the candidate source control policies. In an example, shallow testing may refer to algorithms, such as but not limited to, linear regression, support vector machines, and the like, that may extract patterns from input data without a relatively extensive layer-by-layer analysis.

In an embodiment, the selecting component 360 may be configured to select, as a target trajectory 365T, a selected trajectory from the target cluster $c_0$ 345T that maximizes an energy-saving parameter of the target base station 310T. For example, the selecting component 360 may perform iterative testing of the candidate source control policies of each trajectory of the target cluster $c_0$ 345T, determine for each trajectory of the target cluster $c_0$ 345T, an accumulated reward, and select, as the target trajectory 365T, a trajectory of the target cluster $c_0$ 345T that maximizes the accumulated reward. Alternatively or additionally, the selecting component 360 may perform the of the candidate source control policies of each trajectory of the target cluster $c_0$ 345T for a predetermined number of iterations $\mathcal{T}_N$.

In some embodiments, the unsupervised transfer deep RL framework illustrated in FIG. 3 may select an energy-saving control policy 325T, which corresponds to the target trajectory 365T, that maximizes at least one energy-saving parameter of the target base station 310T and may apply the energy-saving control policy 325T to the target base station 310T. Alternatively or additionally, the unsupervised transfer deep RL framework may monitor one or more energy-saving parameters 317 of the target base station 310T and adjust the energy-saving control policy 325T applied to the target base station 310T based on the one or more energy-saving parameters 317. For example, the unsupervised transfer deep RL framework may determine, based on the monitoring, that at least one of the one or more energy-saving parameters 317 of the target base station 310T is outside of a predetermined range of values, and adjust the energy-saving control policy 325T to cause the at least one of the one or more energy-saving parameters 317 to be within the predetermined range of values. Notably, in some embodiments, the fine-tuning of the energy-saving control policy 325T may not need to be performed, and as such, real-world applicability of the aspects described herein may be further improved when compared to related wireless communication networks.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Alternatively or additionally, a set of (one or more) components shown in FIG. 3 may perform one or more functions described as being performed by another set of components shown in FIG. 3.

Figure 4:
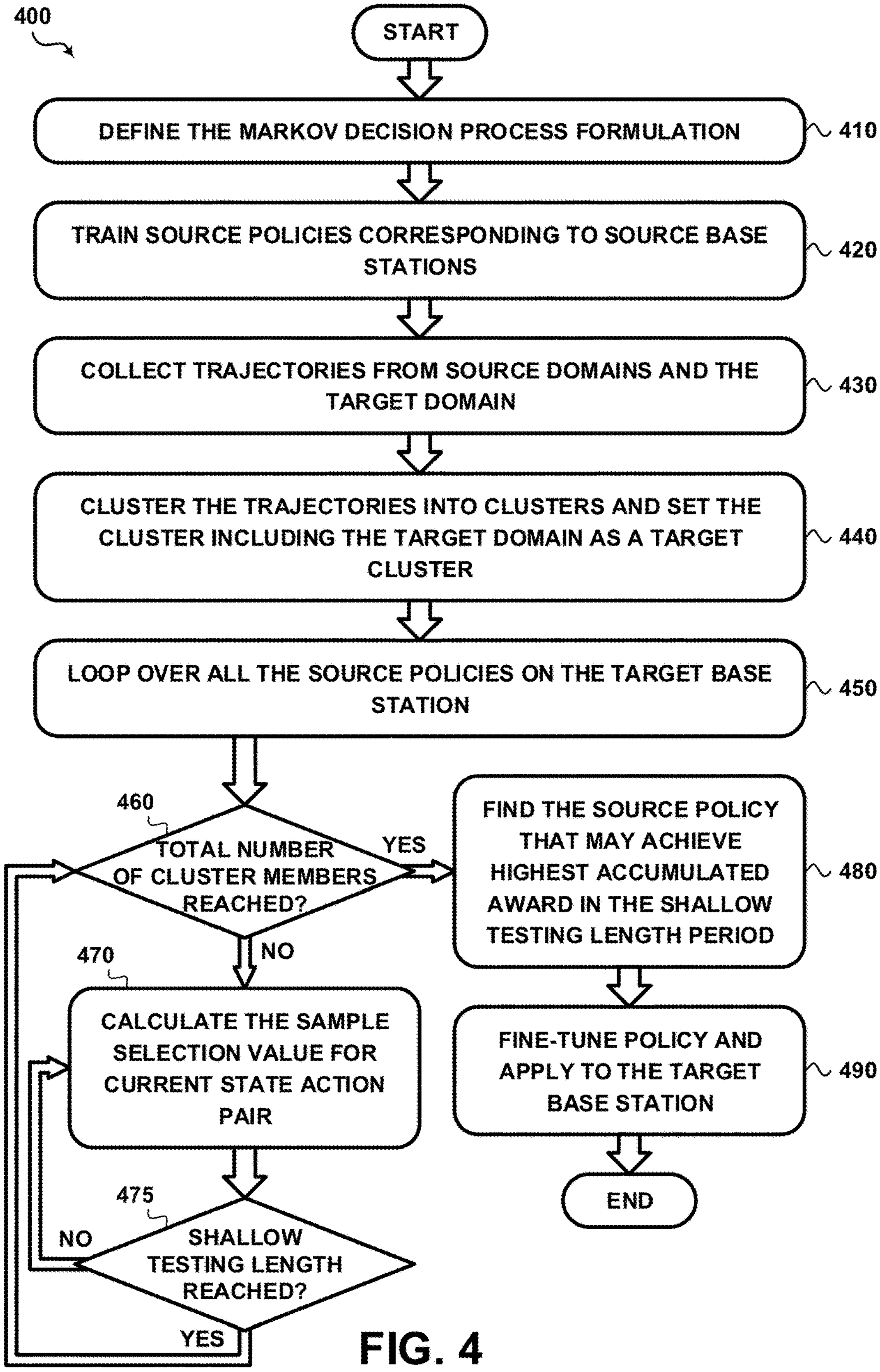
FIG. 4 depicts an example flow chart for operating a target base station, in accordance with various aspects of the present disclosure.

FIG. 4 depicts an example flow chart for operating a target base station, in accordance with various aspects of the present disclosure.

Referring to FIG. 4, a flow chart 400 of an unsupervised transfer deep RL framework that implements one or more aspects of the present disclosure is illustrated. In some embodiments, at least a portion of the flow chart 400 as described with reference to FIG. 4 may be performed by the device 100 of FIG. 1, which may include the energy optimizing component 180. Alternatively or additionally, another computing device (e.g., a base station, a UE, a server, a laptop, a smartphone, a wearable device, a smart device, an IoT device, and the like) that may include the energy optimizing component 180 may perform at least a portion of the flow chart 400. That is, the device 100 may perform a portion of the flow chart 400 as described with reference to FIG. 4 and a remaining portion of the flow chart 400 may be performed by one or more other computing devices.

In some embodiments, the flow chart 400 depicted in FIG. 4 may be used to implement at least a portion of at least one of the example application of FIG. 2, and the unsupervised transfer deep RL framework described with reference to FIG. 3, and may include additional features not mentioned above.

In operation 410, the unsupervised transfer deep RL framework may define the Markov decision process (MDP) formulation. For example, a cell on-off mechanism for optimizing energy saving by a base station of a wireless communication network may be formulated as MDP$\langle \mathcal{S}, \mathcal{A}, r, \mathcal{P} \rangle$, where state $\mathcal{S}$ may represent a continuous state space that may include state variables such as, but not limited to, a number of connected active UEs per cell, a cell load ratio (e.g., physical resource block usage), data throughput per cell, and the like, action $\mathcal{A}$ may represent a continuous action space that may include actions related to activation threshold $th_{act}$ and deactivation threshold $th_{deact}$, reward function $r$ may be based on at least two reward components such as, but not limited to, a power consumption and a minimum data throughput over all the cells, and state transition probability function $\mathcal{P}(s'|s, a)$ may indicate a probability of transitioning to a new state s' from a previous state s after taking an action a.

In operation 420, the unsupervised transfer deep RL framework may train source policies corresponding to source base stations. For example, a base RL algorithm 322 (e.g., a PPO algorithm) may be used to learn the plurality of source control policies 325 (e.g., $\pi_{SA}, \pi_{SB}, \ldots, \pi_{SS}$) from the plurality of source base stations 310.

In operation 430, the unsupervised transfer deep RL framework may collect trajectories from the source domains and the target domain. For example, a plurality of trajectories 327 may be collected that correspond to the plurality of source base stations 310 and the target base station 310T. In some embodiments, the plurality of trajectories 327 may be formulated based on the MDP. That is, each trajectory of the plurality of trajectories 327 may include a state space $\mathcal{S}$, an action space $\mathcal{A}$, a reward function $r$, and a state transition probability function $\mathcal{P}$.

In operation 440, the unsupervised transfer deep RL framework may cluster the trajectories into clusters and may set the cluster including the target domain as a target cluster. For example, a clustering algorithm 342 may be applied to the plurality of trajectories 327 in order to cluster (e.g., group and/or partition) the plurality of trajectories 327 into a plurality of K clusters 345. In some embodiments, the clustering algorithm 342 may be and/or may include a K-means clustering algorithm that may be configured to partition the plurality of trajectories 327 into the plurality of K clusters 345 so as to minimize a variance within each cluster. The unsupervised transfer deep RL framework may select, from the plurality of K clusters 345, a target cluster $c_0$ 345T that corresponds to the target base station 310T and at least one source base station from among the plurality of source base stations 310.

In operation 450, the unsupervised transfer deep RL framework may loop over all the source policies on the target base station. For example, the unsupervised transfer deep RL framework may perform shallow testing on the target domain with the candidate source control policies of the target cluster $c_0$ 345T to determine a candidate source control policy that maximizes an energy-saving parameter of the target base station 310T.

In operation 460, the unsupervised transfer deep RL framework may determine whether the shallow testing has been performed on all the candidate source control policies of the target cluster $c_0$ 345T. When the unsupervised transfer deep RL framework determines that shallow testing has not been performed on all the candidate source control policies of the target cluster $c_0$ 345T (NO in operation 460), the flow chart 400 may proceed to operation 470. Alternatively, when the unsupervised transfer deep RL framework determines that shallow testing has been performed on all the candidate source control policies of the target cluster $c_0$ 345T (YES in operation 460), the flow chart 400 may proceed to operation 480.

In operation 470, the unsupervised transfer deep RL framework may calculate the sample selection value $\alpha(s, a)$ for the current state and action pair (s, a). That is, the unsupervised transfer deep RL framework may perform an iteration of the iterative testing related to the shallow testing in operation 470. In operation 475, the unsupervised transfer deep RL framework may determine whether the shallow testing length $\mathcal{T}_N$ has been reached. That is, the unsupervised transfer deep RL framework may determine whether the iterative testing for the current candidate source control policy has been completed. When the unsupervised transfer deep RL framework determines that the shallow testing length $\mathcal{T}_N$ has not been reached (NO in operation 475), the flow chart 400 may return to operation 470 and perform an additional iteration of the shallow testing. Alternatively, when the unsupervised transfer deep RL framework determines that the shallow testing length $\mathcal{T}_N$ has been reached (YES in operation 475), the flow chart 400 may return to operation 460.

In operation 480, the unsupervised transfer deep RL framework may find the candidate source control policy h* that may achieve a highest (e.g., maximum) accumulated award J in the shallow testing length period $\mathcal{T}_N$.

In operation 490, the unsupervised transfer deep RL framework may fine-tune the candidate source control policy h* and apply the fine-tuned policy to the target base station 310T. For example, the unsupervised transfer deep RL framework monitor one or more energy-saving parameters 317 of the target base station 310T and adjust the candidate source control policy h* such that the one or more energy-saving parameters 317 are within a predetermined range of values.

After performing operation 490, the flow chart 400 may terminate. Alternatively or additionally, the flow chart 400 may proceed to repeat performing operations 410 to 490 on the same target base station 310T and/or a different target base station.

In some embodiments, the unsupervised transfer deep RL framework illustrated in FIG. 3 may select an energy-saving control policy 325T, which corresponds to the target trajectory 365T, that maximizes at least one energy-saving parameter of the target base station 310T and may apply the energy-saving control policy 325T to the target base station 310T. Alternatively or additionally, the unsupervised transfer deep RL framework may monitor one or more energy-saving parameters 317 of the target base station 310T and adjust the energy-saving control policy 325T applied to the target base station 310T based on the one or more energy-saving parameters 317. For example, the unsupervised transfer deep RL framework may determine, based on the monitoring, that at least one of the one or more energy-saving parameters 317 of the target base station 310T is outside of a predetermined range of values, and adjust the energy-saving control policy 325T to cause the at least one of the one or more energy-saving parameters 317 to be within the predetermined range of values. Notably, in some embodiments, the fine-tuning of the energy-saving control policy 325T may not need to be performed, and as such, real-world applicability of the aspects described herein may be further improved when compared to related wireless communication networks.

It is to be understood that the specific order and/or hierarchy of operations in the flow chart 400 as shown in FIG. 4 are an illustration of exemplary approaches. Based upon design preferences, it is understood that the specific order and/or hierarchy of operations in the processes/flowcharts may be rearranged. Further, some operations may be combined or omitted. The accompanying claims present elements of the various operations in a sample order, and are not meant to be limited to the specific order or hierarchy presented.

Figure 5:
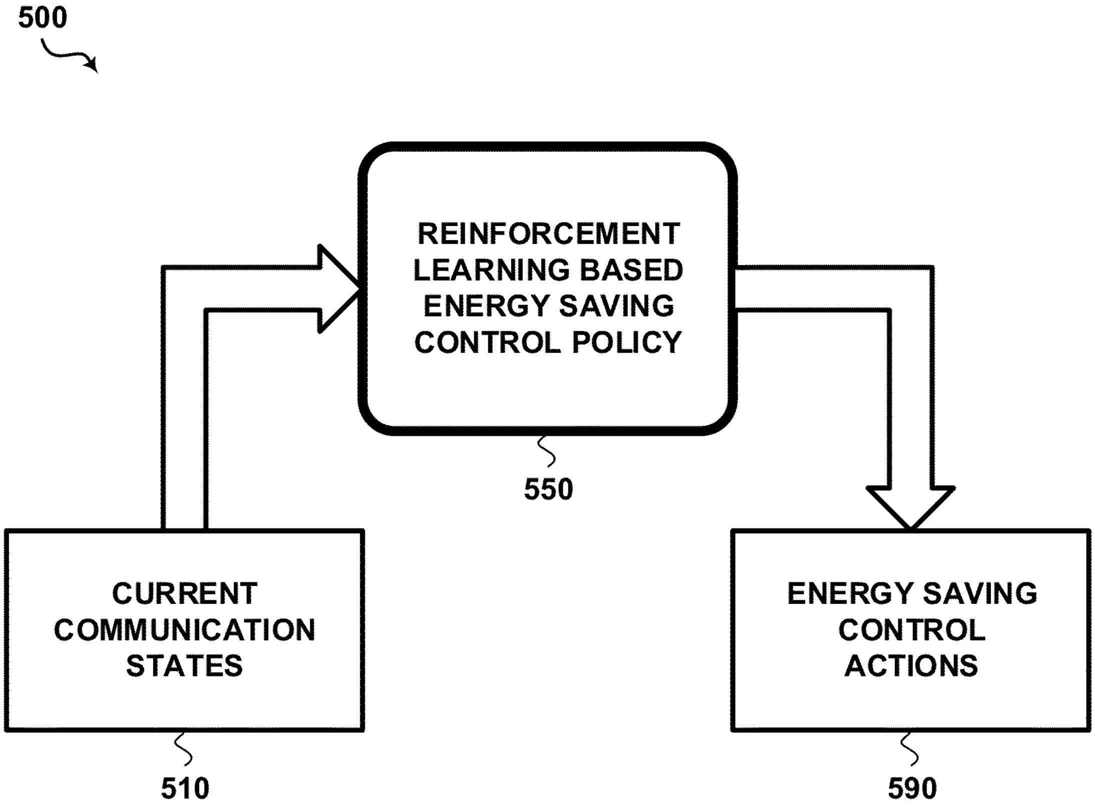
FIG. 5 illustrates an example of a block diagram of a reinforcement learning-based energy-saving control policy, in accordance with various aspects of the present disclosure.

FIG. 5 illustrates an example of a block diagram of an RL-based energy-saving control policy, in accordance with various aspects of the present disclosure.

Referring to FIG. 5, a block diagram 500 of an RL-based energy-saving control policy 550 that implements one or more aspects of the present disclosure is illustrated. In some embodiments, at least a portion of the block diagram 500 as described with reference to FIG. 5 may be performed by the device 100 of FIG. 1, which may include the energy optimizing component 180. Alternatively or additionally, another computing device (e.g., a base station, a UE, a server, a laptop, a smartphone, a wearable device, a smart device, an IoT device, and the like) that may include the energy optimizing component 180 may perform at least a portion of the block diagram 500. That is, the device 100 may perform a portion of the block diagram 500 as described with reference to FIG. 5 and a remaining portion of the block diagram 500 may be performed by one or more other computing devices.

In some embodiments, the block diagram 500 depicted in FIG. 5 may be used to implement at least a portion of at least one of the example application of FIG. 2, the unsupervised transfer deep RL framework described with reference to FIG. 3, and the flow chart 400 of FIG. 4, and may include additional features not mentioned above.

As shown in FIG. 5, the RL-based energy-saving control policy 550 may receive and/or be provided with current communication states 510 of a wireless communication network and may generate energy saving control actions 590, based on the current communication states 510, which may potentially reduce the energy consumption of one or more base stations in the wireless communication network.

For example, the current communication states 510 of a wireless communication network may include measured and/or configured parameters that may provide an indication of a current performance and/or energy-consumption level of the wireless communication network and/or of a specific device and/or node of the wireless communication network. In an embodiment, the current communication states 510 may include, but not be limited to, at least one of number of active serving cells, network load, number of active connected UE members, receive power levels, transmit power levels, signal-to-noise ratio (SNR), data rate, data throughput, block error rate (BLER), modulation and coding schemes (MCS), reference signal received power (RSRP), and the like.

In some embodiments, the RL-based energy-saving control policy 550 may determine energy saving control actions 590 to be taken by a target base station 310T given the current communication states 510. For example, the energy saving control actions 590 may include, but not be limited to, at least one of direct (e.g., individual) on-off decisions for each cell of a base station, cell activation and/or deactivation threshold values for each cell of a base station.

Alternatively or additionally, the RL-based energy-saving control policy 550 may be fine-tuned (e.g., adjusted), based on the current communication states 510 and/or additional measured and/or configured parameters, in order to maintain the one or more energy-saving parameters 317 within a predetermined range of values. Notably, in some embodiments, the fine-tuning of the RL-based energy-saving control policy 550 may not need to be performed, and as such, real-world applicability of the aspects described herein may be further improved when compared to related wireless communication networks.

As described above with reference to FIG. 3, the RL-based energy-saving control policy 550 may be generated by using a pre-trained unsupervised transfer learning model 362 that may learn the RL-based energy-saving control policy 550 based on the candidate source control policies that may have been used to pre-train the learning model. For example, the unsupervised transfer learning model 362 may use (or transfer) knowledge learned from the candidate source control policies to potentially improve and/or accelerate the learning process of the target control policy, and potentially improve a real-world applicability of the RL-based energy-saving control policy, when compared to related wireless communication networks. Alternatively or additionally, the candidate source control policies may have been selected based on a similarity of the candidate source control policies to the target control policy, and thus, the real-world applicability of the RL-based energy-saving control policy may be further improved, when compared to related wireless communication networks.

Figure 6:
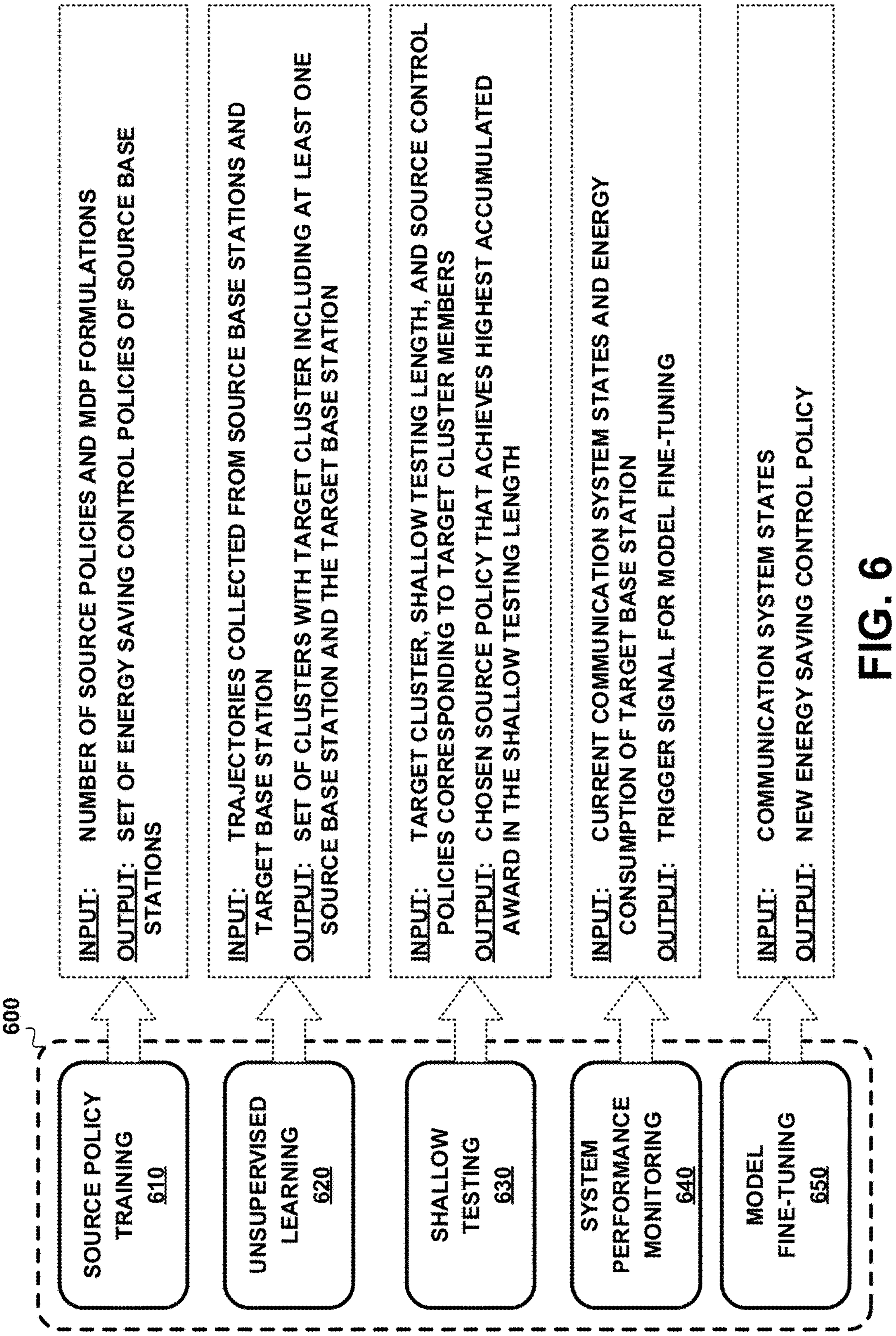
FIG. 6 depicts an example of an unsupervised transfer deep RL framework for operating a target base station, in accordance with various aspects of the present disclosure.

FIG. 6 depicts an example of an unsupervised transfer deep RL framework for operating a target base station, in accordance with various aspects of the present disclosure.

Referring to FIG. 6, an unsupervised transfer deep RL framework 600 that implements one or more aspects of the present disclosure is illustrated. In some embodiments, at least a portion of the unsupervised transfer deep RL framework 600 as described with reference to FIG. 6 may be performed by the device 100 of FIG. 1, which may include the energy optimizing component 180. Alternatively or additionally, another computing device (e.g., a base station, a UE, a server, a laptop, a smartphone, a wearable device, a smart device, an IoT device, and the like) that may include the energy optimizing component 180 may perform at least a portion of the unsupervised transfer deep RL framework 600. That is, the device 100 may perform a portion of the unsupervised transfer deep RL framework 600 as described with reference to FIG. 6 and a remaining portion of the unsupervised transfer deep RL framework 600 may be performed by one or more other computing devices.

In some embodiments, the unsupervised transfer deep RL framework 600 depicted in FIG. 6 may be used to implement at least a portion of at least one of the example application of FIG. 2, the unsupervised transfer deep RL framework described with reference to FIG. 3, the flow chart 400 of FIG. 4, and the RL-based energy-saving control policy 550 described with reference to FIG. 5, and may include additional features not mentioned above.

As shown in FIG. 6, the unsupervised transfer deep RL framework 600 may include a source policy training component 610, an unsupervised learning component 620, a shallow testing component 630, a system performance monitoring component 640, and a model fine-tuning component 650.

The source policy training component 610 may use a base RL algorithm (e.g. base RL algorithm 322 of FIG. 3) to learn a plurality of energy-saving control policies 325 (e.g., $\pi_{SA}$, $\pi_{SB}$, . . . , $\pi_{SS}$) from a plurality of source base stations 310. In some embodiments, an MDP formulation, such as MDP $\langle \mathcal{S}, \mathcal{A}, r, \mathcal{P} \rangle$, for example, may be used to model and/or optimize energy saving by a base station of a wireless communication network. For example, in the formulation, state $\mathcal{S}$ may represent a continuous $N_c \times \mathbb{R}^3$ state space, where $N_c$ may represent the number of cells in the base station, and where, for each cell, parameters such as, but not limited to, a number of connected active UEs per cell, a cell load ratio (e.g., physical resource block usage), data throughput per cell, and the like may be used as state variables. Action $\mathcal{A}$ may represent a continuous $(N_c-1)\times \mathbb{R}^2$ action space. As described above, the activation threshold $th_{act}$ and the deactivation threshold $th_{deact}$ may be used as actions. However, the present disclosure is not limited in this regard, and other or different values and/or parameters may be used as actions. The reward function $r$ may be represented as $r: \mathcal{S}\times\mathcal{A}\times\mathcal{S}\rightarrow\mathbb{R}$. In some embodiments, the reward function $r$ may consider a weighted sum of at least two reward components, such as, but not limited to, a power consumption and a minimum data throughput over all the cells. The state transition probability function $\mathcal{P}(s'|s, a)$ may indicate a probability of transitioning to a new state s' from a previous state s after taking an action a.

The unsupervised learning component 620 may collect a plurality of trajectories 327 corresponding to the plurality of source base stations 310 and the target base station 310T. Each trajectory of the plurality of trajectories 327 may include a state space $\mathcal{S}$, an action space $\mathcal{A}$, a reward function $r$, and a state transition probability function $\mathcal{P}$. In some embodiments, the state space $\mathcal{S}$ may indicate at least one of a number of connected active devices per cell, a cell load ratio, and a throughput per cell. The action space $\mathcal{A}$ may include at least one of activation thresholds and deactivation thresholds. The reward function $r$ may indicate a reward based on at least one of a power consumption and a minimum throughput. The state transition probability function $\mathcal{P}$ may indicate a probability of an action a from the action space $\mathcal{A}$ at a state s of the state space $\mathcal{S}$.

Alternatively or additionally, the unsupervised learning component 620 may apply a clustering algorithm 342 to the plurality of trajectories 327 to cluster (e.g., group and/or partition) the plurality of trajectories 327 into a plurality of K clusters 345. As a result, the plurality of K clusters 345 may include a target cluster $c_0$ 345T that may correspond to the target base station 310T and at least one source base station from among the plurality of source base stations 310.

The shallow testing component 630 may be configured to perform shallow testing on the target domain with the candidate source control policies. Alternatively or additionally, the shallow testing component 630 may be configured to select, as a target trajectory 365T, a selected trajectory from the target cluster $c_0$ 345T that maximizes an energy-saving parameter of the target base station 310T. For example, the shallow testing component 630 may perform iterative testing of the candidate source control policies of each trajectory of the target cluster $c_0$ 345T, determine for each trajectory of the target cluster $c_0$ 345T, an accumulated reward, and select, as the target trajectory 365T, a trajectory of the target cluster $c_0$ 345T that maximizes the accumulated reward. The shallow testing component 630 may perform the iterative testing of the candidate source control policies for a predetermined number of iterations $\mathcal{T}_N$.

The system performance monitoring component 640 may monitor one or more current communication states 510 of the target base station 310T and/or the wireless communication network. For example, the current communication states 510 may include, but not be limited to, at least one of number of active serving cells, network load, number of active connected UE members, receive power levels, transmit power levels, SNR, data rate, data throughput, BLER, MCS, RSRP, and the like. The system performance monitoring component 640 may monitor the one or more current communication states 510 in a periodic, semi-persistent, and/or aperiodic manner. That is, the system performance monitoring component 640 may monitor the one or more current communication states 510 at regular (e.g., same) time intervals, irregular (e.g., different) time intervals, and/or on and as-needed basis. The present disclosure is not limited in this regard.

In some embodiments, the system performance monitoring component 640 may provide a trigger signal and/or indication that the energy-saving control policy 325T applied to the target base station 310T may need to be fine-tuned and/or updated. For example, the system performance monitoring component 640 may indicate that at least one of the current communication states 510 may be outside of a predetermined range of values. The system performance monitoring component 640 may provide the trigger signal and/or indication in a periodic, semi-persistent, and/or aperiodic manner. That is, the system performance monitoring component 640 may provide the trigger signal and/or indication at regular (e.g., same) time intervals, irregular (e.g., different) time intervals, and/or on and as-needed basis. The present disclosure is not limited in this regard.

The model fine-tuning component 650 may be configured to adjust an existing energy-saving control policy 325T and/or create a new energy-saving control policy 325T based on the current communication states 510 and apply the adjusted and/or new energy-saving control policy 325T to the target base station 310T. The model fine-tuning component 650 may adjust and/or create the energy-saving control policy 325T based on the indication that at least one of the current communication states 510 may be outside of a predetermined range of values, and as such, may adjust and/or create the energy-saving control policy 325T to maintain the current communication states 510 within the predetermined range of values. The model fine-tuning component 650 may apply the energy-saving control policy 325T to the target base station 310T in a periodic, semi-persistent, and/or aperiodic manner. That is, the model fine-tuning component 650 may apply the energy-saving control policy 325T at regular (e.g., same) time intervals, irregular (e.g., different) time intervals, and/or on and as-needed basis. The present disclosure is not limited in this regard. For example, the model fine-tuning component 650 may apply the energy-saving control policy 325T to the target base station 310T during low utilization periods in order to minimize a performance impact to users of the target base station 310T.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Alternatively or additionally, a set of (one or more) components shown in FIG. 6 may perform one or more functions described as being performed by another set of components shown in FIG. 6.

Figure 7:
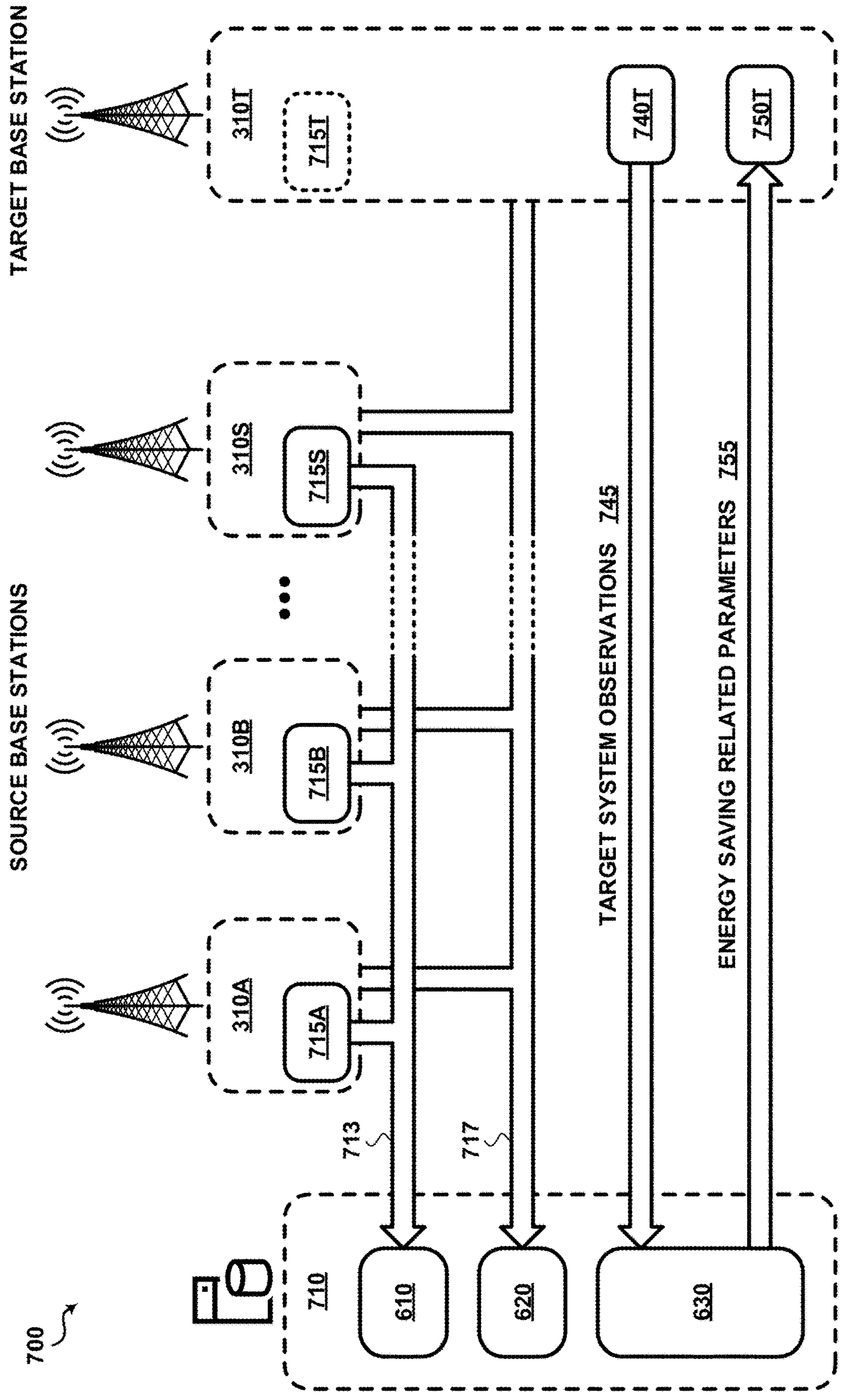
FIG. 7 illustrates an example of a data flow for operating a target base station, in accordance with various aspects of the present disclosure.

FIG. 7 illustrates an example of a data flow for operating a target base station, in accordance with various aspects of the present disclosure.

Referring to FIG. 7, a data flow 700 of an unsupervised transfer deep RL framework that implements one or more aspects of the present disclosure is illustrated. In some embodiments, at least a portion of the data flow 700 as described with reference to FIG. 7 may be performed by the device 100 of FIG. 1, which may include the energy optimizing component 180. Alternatively or additionally, another computing device (e.g., a base station, a UE, a server, a laptop, a smartphone, a wearable device, a smart device, an IoT device, and the like) that may include the energy optimizing component 180 may perform at least a portion of the data flow 700. That is, the device 100 may perform a portion of the data flow 700 as described with reference to FIG. 7 and a remaining portion of the data flow 700 may be performed by one or more other computing devices.

In some embodiments, the data flow 700 depicted in FIG. 7 may be used to implement at least a portion of at least one of the example application of FIG. 2, the unsupervised transfer deep RL framework described with reference to FIG. 3, the flow chart 400 of FIG. 4, the RL-based energy-saving control policy 550 described with reference to FIG. 5, and the unsupervised transfer deep RL framework 600 of FIG. 6, and may include additional features not mentioned above.

The components illustrated in FIG. 7 may include and/or may be similar in many respects to corresponding components having same reference labels described above with reference to FIG. 6, and may include additional features not mentioned above. Consequently, repeated descriptions of the components described above with reference to FIG. 6 may be omitted for the sake of brevity.

As shown in FIG. 7, a computing device 710 may include and/or may be similar in many respects to the device 100 described above with reference to FIG. 1, and may include additional features not mentioned above. Alternatively or additionally, the computing device 710 may be and/or may include a base station, a UE, a server (e.g., a parameter server), a laptop, a smartphone, a wearable device, a smart device, an IoT device, and the like. The computing device 710 includes the energy optimizing component 180 and/or may include the source policy training component 610, the unsupervised learning component 620, and the shallow testing component 630 described above with reference to FIG. 6.

The source policy training component 610 of the computing device 710 may receive and/or may be provided with source system observations 713 from the plurality of base stations 310 (e.g., first source base station 310A, second source base station 310B, to S-th source base station 310S). In some embodiments, each base station of the plurality of base stations 310 may include a corresponding system state monitoring component (e.g., first system state monitoring component 715A, second system state monitoring component 715B, to S-th system state monitoring component 715S, hereinafter generally referred to as "715") that may monitor one or more current communication states 510 of the base station 310 and provide the source system observations 713 to the computing device 710. For example, the source system observations 713 may include, but not be limited to, at least one of number of active serving cells, network load, number of active connected UE members, receive power levels, transmit power levels, signal-to-noise ratio (SNR), data rate, data throughput, block error rate (BLER), modulation and coding schemes (MCS), reference signal received power (RSRP), and the like, for each base station of the plurality of base stations 310.

Each system state monitoring component 715 may monitor the one or more current communication states 510 in a periodic, semi-persistent, and/or aperiodic manner. That is, each system state monitoring component 715 may monitor the one or more current communication states 510 at regular (e.g., same) time intervals, irregular (e.g., different) time intervals, and/or on and as-needed basis. The present disclosure is not limited in this regard. For example, the system state monitoring component 715 may provide the source system observations 713 to the computing device 710 at a substantially similar and/or the same time. As another example, each system state monitoring component 715 may provide the source system observations 713 to the computing device 710 at different time instances and/or intervals from other system state monitoring components 715.

In some embodiments, the system state monitoring component 715 may provide the one or more current communication states 510 to the computing device 710 at a substantially similar and/or the same time that the current communication states 510 are obtained (e.g., captured, measured). Alternatively or additionally, the system state monitoring component 715 may process at least one or more of the current communication states 510 and provide the processed result to the computing device 710. For example, the system state monitoring component 715 may calculate an average, a maximum, a minimum, and the like of the at least one or more of the current communication states 510 and provide the calculated result to the computing device 710.

The source policy training component 610 may use a base RL algorithm (e.g. base RL algorithm 322 of FIG. 3) to learn a plurality of energy-saving control policies 325 (e.g., $\pi_{SA}$, $\pi_{SB}$, . . . , $\pi_{SS}$) from the plurality of source base stations 310. In some embodiments, the source policy training component 610 may use the source system observations 713 to learn the plurality of energy-saving control policies 325.

The unsupervised learning component 620 may collect a plurality of trajectories 327 corresponding to the plurality of source base stations 310 and the target base station 310T, as described with reference to FIG. 6. Each trajectory of the plurality of trajectories 327 may include a state space $\mathcal{S}$, an action space $\mathcal{A}$, a reward function $\mathcal{r}$, and a state transition probability function $\mathcal{p}$. In some embodiments, the state space $\mathcal{S}$ may indicate at least one of a number of connected active devices per cell, a cell load ratio, and a throughput per cell. In some embodiments, the state space $\mathcal{S}$ may be determined based on system observations 717 received from the plurality of source base stations 310 and the target base station 310T, as shown in FIG. 7. The action space $\mathcal{A}$ may include at least one of activation thresholds and deactivation thresholds. The reward function $\mathcal{r}$ may indicate a reward based on at least one of a power consumption and a minimum throughput. The state transition probability function $\mathcal{p}$ may indicate a probability of an action a from the action space $\mathcal{A}$ at a state s of the state space $\mathcal{S}$.

The unsupervised learning component 620, as further described with reference to FIG. 6, may apply a clustering algorithm 342 to the plurality of trajectories 327 to cluster (e.g., group and/or partition) the plurality of trajectories 327 into a plurality of K clusters 345. The plurality of K clusters 345 may include a target cluster $c_0$ 345T that may correspond to the target base station 310T and at least one source base station from among the plurality of source base stations 310.

The shallow testing component 630 may monitor one or more current communication states 510 of the target base station 310T and/or the wireless communication network based on target system observations 745 of the target base station 310T. For example, the current communication states 510 may include, but not be limited to, at least one of number of active serving cells, network load, number of active connected UE members, receive power levels, transmit power levels, SNR, data rate, data throughput, BLER, MCS, RSRP, and the like. The target system observations 745 of the target base station 310T may be provided by a system performance monitoring component 740T of the target base station 310T. The system performance monitoring component 740T may monitor the one or more current communication states 510 in a periodic, semi-persistent, and/or aperiodic manner. That is, the system performance monitoring component 740T may monitor the one or more current communication states 510 at regular (e.g., same) time intervals, irregular (e.g., different) time intervals, and/or on and as-needed basis. The present disclosure is not limited in this regard.

In some embodiments, the shallow testing component 630 may adjust and/or fine-tune one or more energy-saving related parameters 755 based on the target system observations 745 of the target base station 310T. For example, the shallow testing component 630 may adjust and/or fine-tune the one or more energy-saving related parameters 755 in order to maintain the one or more energy-saving related parameters 755 within a predetermined range of values. As shown in FIG. 7, the model fine-tuning component 750T of the target base station 310T may receive the energy-saving related parameters 755. The model fine-tuning component 750T may be configured to adjust an existing energy-saving control policy 325T and/or create a new energy-saving control policy 325T based on energy-saving related parameters 755 and apply the adjusted and/or new energy-saving control policy 325T to the target base station 310T. The model fine-tuning component 750T may apply the energy-saving control policy 325T to the target base station 310T in a periodic, semi-persistent, and/or aperiodic manner. That is, the model fine-tuning component 750T may apply the energy-saving control policy 325T at regular (e.g., same) time intervals, irregular (e.g., different) time intervals, and/or on and as-needed basis. The present disclosure is not limited in this regard. For example, the model fine-tuning component 750T may apply the energy-saving control policy 325T to the target base station 310T during low utilization periods in order to minimize a performance impact to users of the target base station 310T.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Alternatively or additionally, a set of (one or more) components shown in FIG. 7 may perform one or more functions described as being performed by another set of components shown in FIG. 7.

FIG. 8 depicts an example of an algorithm for operating a target base station, in accordance with various aspects of the present disclosure.

Referring to FIG. 8, exemplary pseudo-code of an unsupervised transfer deep RL-based energy saving (UTRLES) algorithm 800 that implements one or more aspects of the present disclosure is illustrated. In some embodiments, at least a portion of the UTRLES algorithm 800 as described with reference to FIG. 8 may be performed by the device 100 of FIG. 1, which may include the energy optimizing component 180. Alternatively or additionally, another computing device (e.g., a base station, a UE, a server, a laptop, a smartphone, a wearable device, a smart device, an IoT device, and the like) that may include the energy optimizing component 180 may perform at least a portion of the UTRLES algorithm 800. That is, the device 100 may perform a portion of the UTRLES algorithm 800 as described with reference to FIG. 8 and a remaining portion of the UTRLES algorithm 800 may be performed by one or more other computing devices.

In some embodiments, the UTRLES algorithm 800 depicted in FIG. 8 may be used to implement at least a portion of at least one of the example application of FIG. 2, the unsupervised transfer deep RL framework described with reference to FIG. 3, the flow chart 400 of FIG. 4, the RL-based energy-saving control policy 550 described with reference to FIG. 5, the unsupervised transfer deep RL framework 600 of FIG. 6, and the data flow 700 described with reference to FIG. 7, and may include additional features not mentioned above.

As shown in FIG. 8, the UTRLES algorithm 800 may receive, as input, pre-trained source control policies 325 (e.g., $\pi_{SA}$, $\pi_{SB}$, . . . , $\pi_{SS}$) that may have been learned from S source domains of the plurality of source base stations 310 via a base RL algorithm 322. The UTRLES algorithm 800 may further receive and/or be provided with a plurality of trajectories 327 (e.g., $\tau_A$, $\tau_B$, . . . , $\tau_S$) that may correspond to the S source domains of the plurality of source base stations 310, and indications and/or values of a total number of clusters K, and a number of iterations $\mathcal{T}_N$ for the shallow testing.

In line 1, the UTRLES algorithm 800 may collect a set of trajectories TT (e.g., $s_0$, $a_0$, $s_1$, $a_1$, . . . , $s_\mathcal{T}$, $a_\mathcal{T}$) that may represent a trajectory that may capture the states s visited by the target base station 310T, the actions a taken by the target base station 310T, and the rewards received by the target base station 310T when following a control policy. In line 2, the UTRLES algorithm 800 may cluster the plurality of source base stations 310 and the target base station 310T into K clusters by applying a K-means clustering algorithm to the plurality of trajectories 327. In line 3, the UTRLES algorithm 800 may set a target cluster $c_0$ 345T that corresponds to the target base station 310T as the target domain. In lines 4 to 9, the UTRLES algorithm 800 may perform shallow testing on the target domain with the candidate source policies. The candidate source policy that corresponds to an optimized performance (e.g., maximum accumulated reward) may be selected as the target control policy 325T and may be applied to the target base station 310T, in lines 10 to 12.

Figure 9:
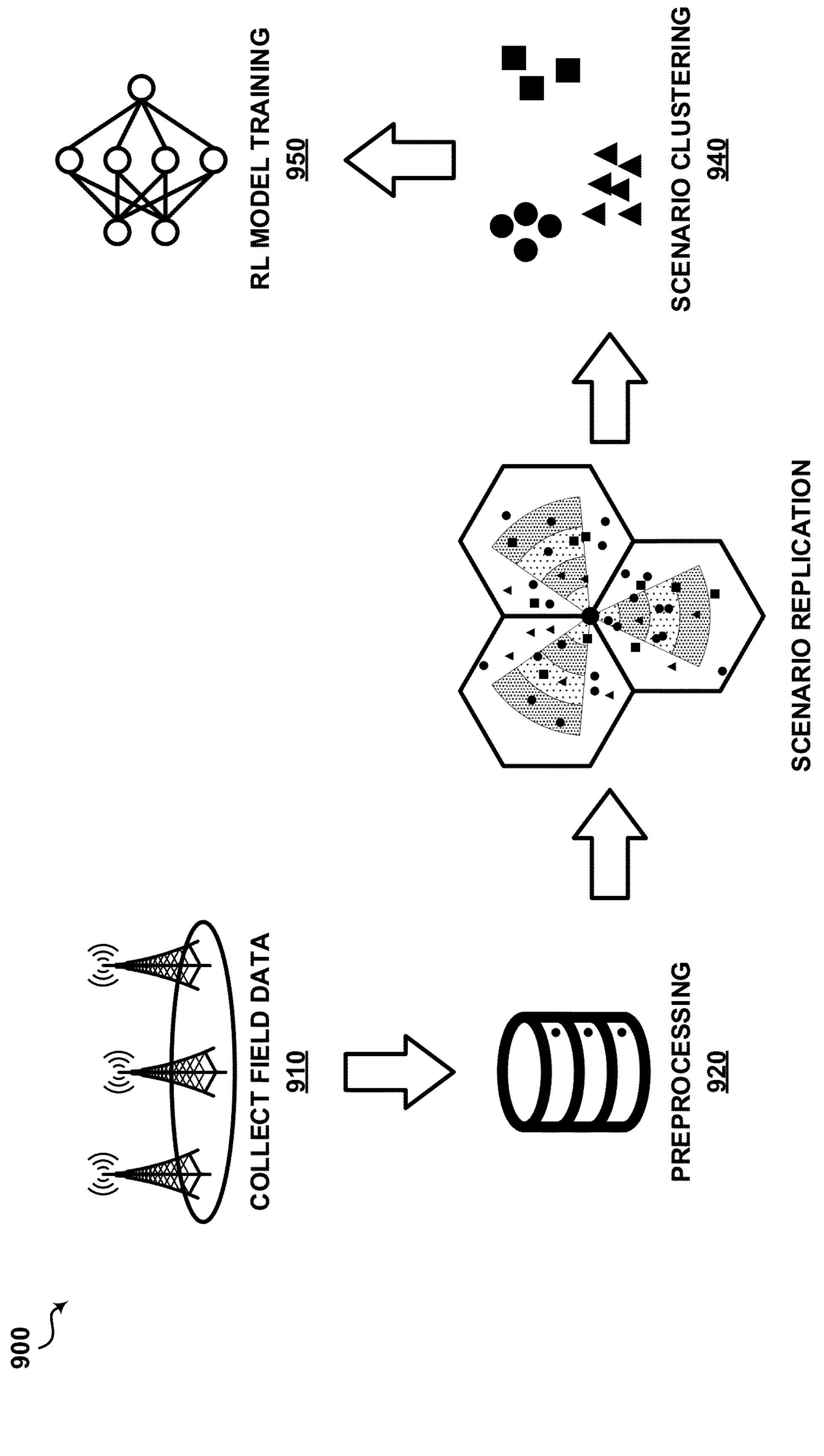
FIG. 9 illustrates an example of a training process, in accordance with various aspects of the present disclosure.

FIG. 9 illustrates an example of a training process, in accordance with various aspects of the present disclosure.

Referring to FIG. 9, a training process 900 of an unsupervised transfer deep RL framework that implements one or more aspects of the present disclosure is illustrated. In some embodiments, at least a portion of the training process 900 as described with reference to FIG. 9 may be performed by the device 100 of FIG. 1, which may include the energy optimizing component 180. Alternatively or additionally, another computing device (e.g., a base station, a UE, a server, a laptop, a smartphone, a wearable device, a smart device, an IoT device, and the like) that may include the energy optimizing component 180 may perform at least a portion of the training process 900. That is, the device 100 may perform a portion of the training process 900 as described with reference to FIG. 9 and a remaining portion of the training process 900 may be performed by one or more other computing devices.

In some embodiments, the unsupervised transfer deep RL framework trained according to the training process 900 depicted in FIG. 9 may be used to implement at least a portion of at least one of the example application of FIG. 2, the unsupervised transfer deep RL framework described with reference to FIG. 3, the flow chart 400 of FIG. 4, the RL-based energy-saving control policy 550 described with reference to FIG. 5, the unsupervised transfer deep RL framework 600 of FIG. 6, the data flow 700 described with reference to FIG. 7, and the algorithm 800 of FIG. 8, and may include additional features not mentioned above.

As shown in FIG. 9, field data may be collected from an existing communication network, in operation 910. The field data may include cell configurations such as, but not limited to, bandwidth, and/or traffic and performance indicators such as, but not limited to, number of active UEs, network throughput, and cell loads over a time period. In operation 920, the field data may be preprocessed. The preprocessing of operation 920 may include, but not be limited to, filtering out corrupted data, filling missing values through interpolation, and the like. In operation 930, a replicative simulator may be used to mimic the traffic and/or network behavior in the field data. The simulated network cell configuration and state (e.g., number of active UEs, throughput, and/or cell load) may be replicated to match the field data at predetermined time periods (e.g., one (1) minute, one (1) hour, four (4) hours, and the like). In some embodiments, the state transitions of the simulated network cell configuration and state may be fitted into a learned model using a fully automated approach. In operation 940, simulated data may be collected by executing the replicated scenarios and clustering the scenarios into a plurality of groups. For example, the scenarios may be clustered into three (3) groups that may represent high traffic conditions, medium traffic conditions, and low traffic conditions. However, the present disclosure is not limited in this regard, and the simulated data may be clustered into fewer, more, or different groups. In operation 950, a base RL algorithm (e.g., base RL algorithm 322 of FIG. 3) may be trained using at least a portion of the source scenarios from each group. In some embodiments, a portion of the source scenarios may be randomly selected from each group for training the base RL algorithm and remaining source scenarios may be used as target scenarios.

Advantageously, the methods, apparatuses, systems, and non-transitory computer-readable mediums for operating a target base station, described above with reference to FIGS. 1 to 9, provide optimizing and potentially reducing energy consumption of wireless communication networks, and base stations thereof in particular. Furthermore, aspects presented herein provide for utilizing an unsupervised transfer deep RL framework to model a cell on-off mechanism to potentially reduce the energy consumption of a base station. In addition, aspects presented herein provide selecting, via clustering and shallow testing, an energy-saving control policy from candidate source policies that maximizes an energy-saving parameter of a target base station and potentially reduces the energy consumption of the base station without a need for further fine-tuning of the energy-saving control policy. The aspects described herein may also be applicable to other resource optimization scenarios of multi-access technologies and the telecommunication standards that employ these technologies.

Figure 10:
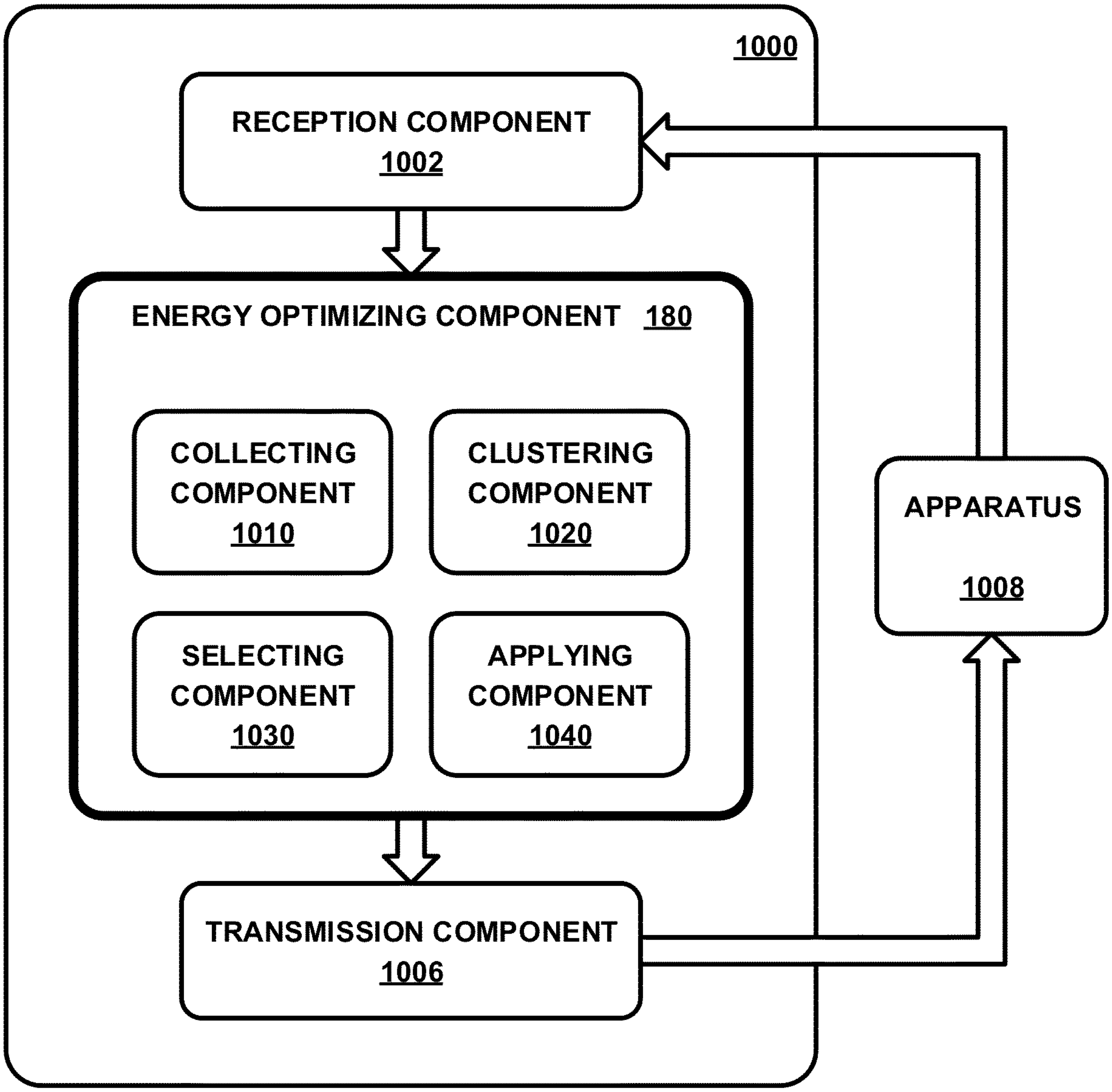
FIG. 10 depicts a block diagram of an example apparatus for operating a target base station, in accordance with various aspects of the present disclosure.

FIG. 10 depicts a block diagram of an example apparatus for operating a target base station, in accordance with various aspects of the present disclosure. The apparatus 1000 may be a computing device (e.g., device 100 of FIG. 1) and/or a computing device may include the apparatus 1000. In some embodiments, the apparatus 1000 may include a reception component 1002 configured to receive communications (e.g., wired, wireless) from another apparatus (e.g., apparatus 1008), an energy optimizing component 180 configured to operate a target base station, and a transmission component 1006 configured to transmit communications (e.g., wired, wireless) to another apparatus (e.g., apparatus 1008). The components of the apparatus 1000 may be in communication with one another (e.g., via one or more buses or electrical connections). As shown in FIG. 10, the apparatus 1000 may be in communication with another apparatus 1008 (such as, but not limited to, a base station, a server, a laptop, a smartphone, a UE, a wearable device, a smart device, an IoT device, and the like) using the reception component 1002 and/or the transmission component 1006.

In some embodiments, the apparatus 1000 may be configured to perform one or more operations described herein in connection with FIG. 1 to 9. Alternatively or additionally, the apparatus 1000 may be configured to perform one or more processes described herein, such as method 1100 of FIG. 11. In some embodiments, the apparatus 1000 may include one or more components of the device 100 described with reference to FIG. 1.

The reception component 1002 may receive communications, such as control information, data communications, or a combination thereof, from the apparatus 1008 (e.g., a base station, a server, a laptop, a smartphone, a UE, a wearable device, a smart device, an IoT device, and the like). The reception component 1002 may provide received communications to one or more other components of the apparatus 1000, such as the energy optimizing component 180. In some embodiments, the reception component 1002 may perform signal processing on the received communications, and may provide the processed signals to the one or more other components. In some embodiments, the reception component 1002 may include one or more antennas, a receive processor, a controller/processor, a memory, or a combination thereof, of the device 100 described with reference to FIG. 1.

The transmission component 1006 may transmit communications, such as control information, data communications, or a combination thereof, to the apparatus 1008 (e.g., a base station, a server, a laptop, a smartphone, a UE, a wearable device, a smart device, an IoT device, and the like). In some embodiments, the energy optimizing component 180 may generate communications and may transmit the generated communications to the transmission component 1006 for transmission to the apparatus 1008. In some embodiments, the transmission component 1006 may perform signal processing on the generated communications, and may transmit the processed signals to the apparatus 1008. In other embodiments, the transmission component 1006 may include one or more antennas, a transmit processor, a controller/processor, a memory, or a combination thereof, of the device 100 described with reference to FIG. 1. In some embodiments, the transmission component 1006 may be co-located with the reception component 1002 such as in a transceiver and/or a transceiver component.

The energy optimizing component 180 may be configured to operate a target base station. In some embodiments, the energy optimizing component 180 may include a set of components, such as a collecting component 1010 configured to collect a plurality of trajectories, a clustering component 1020 configured to cluster the plurality of trajectories into a plurality of clusters, a selecting component 1030 configured to select as a target trajectory, a selected trajectory from the target cluster that maximizes an energy-saving parameter of the target base station, and an applying component 1040 configured to apply an energy-saving control policy to the target base station.

In some embodiments, the set of components may be separate and distinct from the energy optimizing component 180. In other embodiments, one or more components of the set of components may include or may be implemented within a controller/processor (e.g., the processor 120), a memory (e.g., the memory 130), or a combination thereof, of the device 100 described above with reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIGS. 1 to 9.

Figure 11:
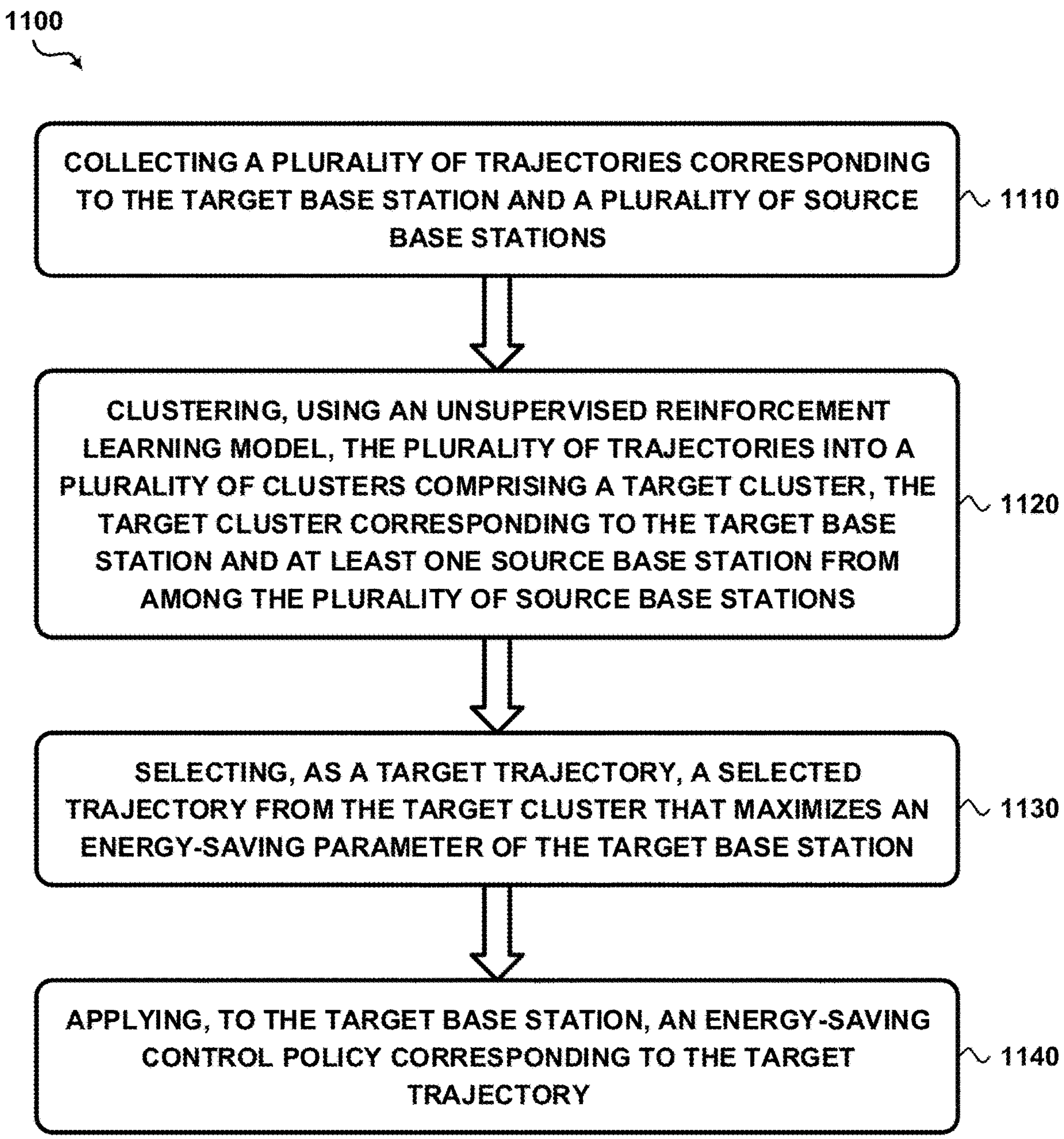
FIG. 11 illustrates a flowchart of an example method of operating a target base station, in accordance with various aspects of the present disclosure.

Referring to FIG. 11, in operation, an apparatus 1000 may perform a method 1100 of operating a target base station. The method 1100 may be performed by at least one of the device 100 (which may include the processor 120, the memory 130, and the storage component 140, and which may be the entire device 100 and/or include one or more components of the device 100, such as the input component 150, the output component 160, the communication interface 170, and/or the energy optimizing component 180) and/or the apparatus 1000. The method 1100 may be performed by the device 100, the apparatus 1000, and/or the energy optimizing component 180 in communication with the apparatus 1008 (e.g., a base station, a server, a laptop, a smartphone, a UE, a wearable device, a smart device, an IoT device, and the like).

At block 1110 of FIG. 11, the method 1100 may include collecting a plurality of trajectories corresponding to the target base station and a plurality of source base stations. For example, in an aspect, the device 100, the energy optimizing component 180, and/or the collecting component 1010 may be configured to or may include means for collecting a plurality of trajectories 327 corresponding to the target base station 310T and a plurality of source base stations 310.

For example, the collecting at block 1110 may be performed to model the behavior of each base station of the plurality of source base stations 310 and provide for the selection of a source base station that may be similar to the target base station 310T.

At block 1120 of FIG. 11, the method 1100 may include clustering, using an unsupervised reinforcement learning model, the plurality of trajectories into a plurality of clusters comprising a target cluster, the target cluster corresponding to the target base station and at least one source base station from among the plurality of source base stations. For example, in an aspect, the device 100, the energy optimizing component 180, and/or the clustering component 1120 may be configured to or may include means for clustering, using an unsupervised reinforcement learning model 342, the plurality of trajectories 327 into a plurality of clusters 345 comprising a target cluster 345T, the target cluster 345T corresponding to the target base station 310T and at least one source base station 310 from among the plurality of source base stations 310.

For example, the clustering at block 1120 may include applying a K-means clustering algorithm that may be configured to partition the plurality of trajectories 327 into the plurality of K clusters 345 so as to minimize a variance within each cluster, as described with reference to FIG. 3. In some embodiments, the clustering algorithm 342 may be configured to minimize a WCSS variance that may be based on the sum of squared distances between each trajectory 327 and a centroid of the cluster 345.

Further, for example, the clustering at block 1120 may be performed to provide for the selection of a target cluster $c_0$ 345T that may correspond to the target base station 310T and at least one source base station from among the plurality of source base stations 310, and that may include candidate source base stations that may be similar to the target base station 310T.

At block 1130 of FIG. 11, the method 1100 may include selecting, as a target trajectory, a selected trajectory from the target cluster that maximizes an energy-saving parameter of the target base station. For example, in an aspect, the device 100, the energy optimizing component 180, and/or the selecting component 1130 may be configured to or may include means for selecting, as a target trajectory 365T, a selected trajectory from the target cluster 345T that maximizes an energy-saving parameter of the target base station 310T.

For example, the selecting at block 1130 may include selecting an energy-saving control policy 325T, which may correspond to the target trajectory 365T, that may maximize at least one energy-saving parameter of the target base station 310T, as described with reference to FIG. 3.

In some embodiments, the selecting at block 1130 may include performing iterative testing of respective control policies of each trajectory of the target cluster $c_0$ 345T, determining, for each trajectory of the target cluster $c_0$ 345T, an accumulated reward, and selecting, as the target trajectory 365T, a trajectory of the target cluster $c_0$ 345T that maximizes the accumulated reward.

In optional or additional embodiments, the selecting at block 1130 may include performing iterative testing of the respective control policies of each trajectory of the target cluster $c_0$ 345T for a predetermined number of iterations $\mathcal{T}_N$.

Further, for example, the selecting at block 1130 may be performed to select an energy-saving control policy 325T that optimizes and potentially reduces the energy consumption of the target base station 310T.

At block 1140 of FIG. 11, the method 1100 may include applying, to the target base station, an energy-saving control policy corresponding to the target trajectory. For example, in an aspect, the device 100, the energy optimizing component 180, and/or the applying component 1140 may be configured to or may include means for applying, to the target base station 310T, an energy-saving control policy 325T corresponding to the target trajectory 365T.

For example, the applying at block 1140 may be performed in a periodic, semi-persistent, and/or aperiodic manner, as described with reference to FIG. 3.

Further, for example, the applying at block 1140 may be performed to maximize an energy-saving parameter of a target base station 310T and potentially reduce the energy consumption of the target base station 310T without a need for further fine-tuning of the energy-saving control policy 325T.

In an optional or additional aspect that may be combined with any other aspects, the method 1100 may further include monitoring one or more energy-saving parameters of the target base station, and adjusting the energy-saving control policy 325T applied to the target base station 310T based on the one or more energy-saving parameters.

In some embodiments, the adjusting of the energy-saving control policy 325T of the method 1100 may include determining, based on the monitoring, that at least one of the one or more energy-saving parameters of the target base station 310T may be outside of a predetermined range of values, and adjusting the energy-saving control policy 325T to cause the at least one of the one or more energy-saving parameters to be within the predetermined range of values.

In an optional or additional aspect that may be combined with any other aspects, the method 1100 may further include generating, using a base reinforcement learning model, a plurality of source control policies 325 corresponding to the plurality of source base stations 310.

In some embodiments, the collecting of the plurality of trajectories 327 of the method 1100 may include collecting a plurality of source base station trajectories 327 corresponding to the plurality of source base stations 310, based on the plurality of source control policies 325. In some embodiments, the applying of the energy-saving control policy 325T of the method 1100 may include selecting the energy-saving control policy 325T from among a control policy of the target base station 310T and the plurality of source control policies 325.

In an optional or additional aspect that may be combined with any other aspects, the method 1100 may further include formulating the plurality of trajectories 327 based on an MDP. In such embodiments, each trajectory of the plurality of trajectories may include a state space, an action space, a reward function, and a state transition probability function. The state space may indicate at least one of a number of connected active devices per cell, a cell load ratio, and a throughput per cell. The action space may include at least one of activation thresholds and deactivation thresholds. The reward function may indicate a reward based on at least one of a power consumption and a minimum throughput or another metric that can reflect current system performance. The state transition probability function may indicate a probability of an action from the action space at a state of the state space.

The following aspects are illustrative only and aspects thereof may be combined with aspects of other embodiments or teaching described herein, without limitation.

Aspect 1 is a method for operating a target base station by an apparatus. The method includes collecting a plurality of trajectories corresponding to the target base station and a plurality of source base stations, clustering, using an unsupervised reinforcement learning model, the plurality of trajectories into a plurality of clusters including a target cluster, selecting, as a target trajectory, a selected trajectory from the target cluster that maximizes an energy-saving parameter of the target base station, and applying, to the target base station, an energy-saving control policy corresponding to the target trajectory. The target cluster corresponds to the target base station and at least one source base station from among the plurality of source base stations.

In Aspect 2, the method of claim 1 includes monitoring one or more energy-saving parameters of the target base station, and adjusting the energy-saving control policy applied to the target base station based on the one or more energy-saving parameters.

In Aspect 3, the adjusting of the energy-saving control policy of any of Aspects 1 or 2 includes determining, based on the monitoring, that at least one of the one or more energy-saving parameters of the target base station may be outside of a predetermined range of values, and adjusting the energy-saving control policy to cause the at least one of the one or more energy-saving parameters to be within the predetermined range of values.

In Aspect 4, the method of any of Aspects 1 to 3 includes generating, using a base reinforcement learning model, a plurality of source control policies corresponding to the plurality of source base stations.

In Aspect 5, the collecting of the plurality of trajectories of any of Aspects 1 to 4 includes collecting a plurality of source base station trajectories corresponding to the plurality of source base stations, based on the plurality of source control policies, and the applying of the energy-saving control policy includes selecting the energy-saving control policy from among a control policy of the target base station and the plurality of source control policies.

In Aspect 6, the method of any of Aspects 1 to 5 includes formulating the plurality of trajectories based on a Markov Decision Process (MDP). Each trajectory of the plurality of trajectories includes a state space, an action space, a reward function, and a state transition probability function.

In Aspect 7, the state space of any of Aspects 1 to 6 indicates at least one of a number of connected active devices per cell, a cell load ratio, and a throughput per cell, the action space of any of Aspects 1 to 6 includes at least one of activation thresholds and deactivation thresholds, the reward function of any of Aspects 1 to 6 indicates a reward based on at least one of a power consumption and a minimum throughput, and the state transition probability function of any of Aspects 1 to 6 indicates a probability of an action from the action space at a state of the state space.

In Aspect 8, the selecting of the target trajectory of any of Aspects 1 to 7 includes performing iterative testing of respective control policies of each trajectory of the target cluster, determining, for each trajectory of the target cluster, an accumulated reward, and selecting, as the target trajectory, the selected trajectory from the target cluster that maximizes the accumulated reward.

In Aspect 9, the performing of the iterative testing of any of Aspects 1 to 8 includes performing iterative testing of the respective control policies of each trajectory of the target cluster for a predetermined number of iterations.

Aspect 10 is an apparatus for operating a target base station. The apparatus includes a memory storing instructions, and one or more processors communicatively coupled to the memory. The one or more processors are configured to execute the instructions to perform one or more of the methods of any of Aspects 1 to 9.

Aspect 11 is an apparatus for operating a target base station. The apparatus includes means for performing one or more of the methods of any of Aspects 1 to 9.

Aspect 12 is a non-transitory computer-readable storage medium storing computer-executable instructions for operating a target base station by an apparatus. The computer-executable instructions are configured, when executed by one or more processors of the apparatus, to cause the apparatus to perform one or more of the methods of any of Aspects 1 to 9.

The foregoing disclosure provides illustration and description, but may not be intended to be exhaustive or to limit the implementations to the precise form disclosed. Modifications and variations are possible in light of the above disclosure or may be acquired from practice of the implementations.

For example, the terms "component," "module," "system" and the like are intended to include a computer-related entity, such as but not limited to hardware, firmware, a combination of hardware and software, software, or software in execution. For example, a component may be, but may not be limited to being, a process running on a processor, a processor, an object, an executable, a thread of execution, a program, and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations. Non-transitory computer-readable media may exclude transitory signals.

The computer readable storage medium may be a tangible device that may retain and store instructions for use by an instruction execution device. The computer readable storage medium may be, for example, but may not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EEPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, for example, may not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local-area network (LAN) or a wide-area network (WAN), or the connection may be made to an external computer (for example, through the Internet using an internet service provider (ISP)). In some embodiments, electronic circuitry including, for example, programmable logic circuitry, field programmable gate arrays (FPGA), and/or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings (e.g., FIGS. 1 and 3-10) may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, and the like, that may execute the respective functions through controls of one or more microprocessors or other control apparatuses. Also, at least one of these components may be specifically embodied by a module, a program, or a part of code, which may contain one or more executable instructions for performing specified logic functions, and may be executed by one or more microprocessors or other control apparatuses. Further, at least one of these components may include or may be implemented by a processor such as a central processing unit (CPU) that may perform the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which includes one or more executable instructions for implementing the specified logical functions. The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It may be apparent that systems and/or methods, described herein, may be implemented in different forms of hardware, firmware, or a combination of hardware and software. The actual specialized control hardware or software code used to implement these systems and/or methods may not be limiting of the implementations. Thus, the operation and behavior of the systems and/or methods were described herein without reference to specific software code—it being understood that software and hardware may be designed to implement the systems and/or methods based on the description herein.

No element, act, or instruction described in the present disclosure should be construed as critical or essential unless explicitly described as such. Also, for example, the articles "a" and "an" may be intended to include one or more items, and may be used interchangeably with "one or more." Furthermore, for example, the term "set" may be intended to include one or more items (e.g., related items, unrelated items, a combination of related and unrelated items, and the like), and may be used interchangeably with "one or more." Where only one item may be intended, the term "one" or similar language may be used. Also, for example, the terms "has," "have," "having," "includes," "including," or the like may be intended to be open-ended terms. Further, the phrase "based on" may be intended to mean "based, at least in part, on" unless explicitly stated otherwise. In addition, expressions such as "at least one of [A] and [B]" or "at least one of [A] or [B]" may be understood to include only A, only B, or both A and B.

Reference throughout this specification to "one embodiment," "an embodiment," or similar language may indicate that a particular feature, structure, or characteristic described in connection with the indicated embodiment may be included in at least one embodiment of the present solution. Thus, the phrases "in one embodiment", "in an embodiment," and similar language throughout this specification may, but do not necessarily, all refer to the same embodiment. For example, such terms as "1st" and "2nd," or "first" and "second" may be used to simply distinguish a corresponding component from another, and does not limit the components in other aspects (e.g., importance or order). It may be understood that if an element (e.g., a first element) may be referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It may be understood that when an element or layer may be referred to as being "over," "above," "on," "below," "under," "beneath," "connected to" or "coupled to" another element or layer, it may be directly over, above, on, below, under, beneath, connected or coupled to the other element or layer or intervening elements or layers may be present. In contrast, when an element may be referred to as being "directly over," "directly above," "directly on," "directly below," "directly under," "directly beneath," "directly connected to" or "directly coupled to" another element or layer, there are no intervening elements or layers present.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations may be apparent to those of ordinary skill in the art without departing from the scope of the described embodiments. The terminology used herein may be chosen to best explain the principles of the embodiments, the practical application or technical improvement over technologies found in the marketplace, or to enable others of ordinary skill in the art to understand the embodiments disclosed herein.

It may be understood that the specific order or hierarchy of blocks in the processes/flowcharts disclosed are an illustration of exemplary approaches. Based upon design preferences, it may be understood that the specific order or hierarchy of blocks in the processes/flowcharts may be rearranged. Further, some blocks may be combined and/or omitted. The accompanying claims present elements of the various blocks in a sample order, and are not meant to be limited to the specific order or hierarchy presented.

Furthermore, the described features, advantages, and characteristics of the present disclosure may be combined in any suitable manner in one or more embodiments. One skilled in the relevant art may recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

What is claimed is:

1. A method for operating a target base station, and performed by an apparatus, the method comprising:

collecting a plurality of trajectories corresponding to the target base station and a plurality of source base stations;

clustering, using an unsupervised reinforcement learning model, the plurality of trajectories into a plurality of clusters comprising a target cluster, the target cluster corresponding to the target base station and at least one source base station from among the plurality of source base stations;

selecting, as a target trajectory, a selected trajectory from the target cluster that maximizes an energy-saving parameter of the target base station;

applying, to the target base station, an energy-saving control policy corresponding to the target trajectory; and adjusting the energy-saving control policy applied to the target base station based on one or more energy-saving parameters.

2. The method of claim 1, further comprising:

monitoring the one or more energy-saving parameters of the target base station.

3. The method of claim 2, wherein the adjusting of the energy-saving control policy comprises:

determining, based on the monitoring, that at least one of the one or more energy-saving parameters of the target base station is outside of a predetermined range of values; and adjusting the energy-saving control policy to cause the at least one of the one or more energy-saving parameters to be within the predetermined range of values.

4. The method of claim 1, further comprising:

generating, using a base reinforcement learning model, a plurality of source control policies corresponding to the plurality of source base stations.

5. The method of claim 4, wherein the collecting of the plurality of trajectories comprises collecting a plurality of source base station trajectories corresponding to the plurality of source base stations, based on the plurality of source control policies, and wherein the applying of the energy-saving control policy comprises selecting the energy-saving control policy from among a control policy of the target base station and the plurality of source control policies.

6. The method of claim 1, further comprising:

formulating the plurality of trajectories based on a Markov Decision Process (MDP), wherein each trajectory of the plurality of trajectories comprises a state space, an action space, a reward function, and a state transition probability function.

7. The method of claim 6, wherein the state space indicates at least one of a number of connected active devices per cell, a cell load ratio, and a throughput per cell, wherein the action space comprises at least one of activation thresholds and deactivation thresholds, wherein the reward function indicates a reward based on at least one of a power consumption and a minimum throughput, and wherein the state transition probability function indicates a probability of an action from the action space at a state of the state space.

8. The method of claim 1, wherein the selecting of the target trajectory comprises:

performing iterative testing of respective control policies of each trajectory of the target cluster;

determining, for each trajectory of the target cluster, an accumulated reward; and selecting, as the target trajectory, a trajectory of the target cluster that maximizes the accumulated reward.

9. The method of claim 8, wherein the performing of the iterative testing comprises performing testing of the respective control policies of each trajectory of the target cluster for a predetermined number of iterations.

10. An apparatus for operating a target base station, the apparatus comprising:

a memory storing instructions; and one or more processors communicatively coupled to the memory; wherein the one or more processors are configured to execute the instructions to:

collect a plurality of trajectories corresponding to the target base station and a plurality of source base stations;

cluster, using an unsupervised reinforcement learning model, the plurality of trajectories into a plurality of clusters comprising a target cluster, the target cluster corresponding to the target base station and at least one source base station from among the plurality of source base stations;

select, as a target trajectory, a selected trajectory from the target cluster that maximizes an energy-saving parameter of the target base station;

apply, to the target base station, an energy-saving control policy corresponding to the target trajectory; and adjust the energy-saving control policy applied to the target base station based on one or more energy-saving parameters.

11. The apparatus of claim 10, wherein the one or more processors are further configured to execute further instructions to:

monitor the one or more energy-saving parameters of the target base station.

12. The apparatus of claim 11, wherein the one or more processors are further configured to execute further instructions to:

determine, based on the monitoring, that at least one of the one or more energy-saving parameters of the target base station is outside of a predetermined range of values; and adjust the energy-saving control policy to cause the at least one of the one or more energy-saving parameters to be within the predetermined range of values.

13. The apparatus of claim 10, wherein the one or more processors are further configured to execute further instructions to:

generate, using a base reinforcement learning model, a plurality of source control policies corresponding to the plurality of source base stations.

14. The apparatus of claim 13, wherein the one or more processors are further configured to execute further instructions to:

collect a plurality of source base station trajectories corresponding to the plurality of source base stations, based on the plurality of source control policies; and select the energy-saving control policy from among a control policy of the target base station and the plurality of source control policies.

15. The apparatus of claim 10, wherein the one or more processors are further configured to execute further instructions to:

formulate the plurality of trajectories based on a Markov Decision Process (MDP), wherein each trajectory of the plurality of trajectories comprises a state space, an action space, a reward function, and a state transition probability function.

16. The apparatus of claim 15, wherein the state space indicates at least one of a number of connected active devices per cell, a cell load ratio, and a throughput per cell, wherein the action space comprises at least one of activation thresholds and deactivation thresholds, wherein the reward function indicates a reward based on at least one of a power consumption and a minimum throughput, and wherein the state transition probability function indicates a probability of an action from the action space at a state of the state space.

17. The apparatus of claim 10, wherein the one or more processors are further configured to execute further instructions to:

perform iterative testing of respective control policies of each trajectory of the target cluster;

determine, for each trajectory of the target cluster, an accumulated reward; and select, as the target trajectory, the selected trajectory from the target cluster that maximizes the accumulated reward.

18. The apparatus of claim 17, wherein the one or more processors are further configured to execute further instructions to:

perform iterative testing of the respective control policies of each trajectory of the target cluster for a predetermined number of iterations.

19. A non-transitory computer-readable storage medium storing computer-executable instructions for operating a target base station by an apparatus that, when executed by at least one processor of the apparatus, cause the apparatus to:

collect a plurality of trajectories corresponding to the target base station and a plurality of source base stations;

cluster, using an unsupervised reinforcement learning model, the plurality of trajectories into a plurality of clusters comprising a target cluster, the target cluster corresponding to the target base station and at least one source base station from among the plurality of source base stations;

select, as a target trajectory, a selected trajectory from the target cluster that maximizes an energy-saving parameter of the target base station;

apply, to the target base station, an energy-saving control policy corresponding to the target trajectory; and adjust the energy-saving control policy applied to the target base station based on one or more energy-saving parameters.

20. The non-transitory computer-readable storage medium of claim 19, wherein the computer-executable instructions, when executed by the at least one processor, further cause the apparatus to:

monitor one or more energy-saving parameters of the target base station.

* * * * *